(12) United States Patent
Ito et al.

(10) Patent No.: US 6,342,121 B1
(45) Date of Patent: Jan. 29, 2002

(54) METHOD OF MANUFACTURING PLANO LENS

(75) Inventors: Tomotaka Ito, Kanagawa; Hidetoshi Watanabe, Chiba, both of (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/613,328

(22) Filed: Jul. 10, 2000

Related U.S. Application Data

(62) Division of application No. 09/148,710, filed on Sep. 4, 1998, now Pat. No. 6,096,159.

(30) Foreign Application Priority Data

Sep. 12, 1997 (JP) ............................................. 9-248413

(51) Int. Cl.[7] .............................. B32B 31/28; G02B 3/00
(52) U.S. Cl. ................................ 156/275.5; 156/275.7; 156/279
(58) Field of Search ............................... 156/267, 275.5, 156/275.7, 279; 427/203

(56) References Cited

U.S. PATENT DOCUMENTS 2,378,252 A * 6/1945 Staehle et al.

* cited by examiner

Primary Examiner—Sam Chuan Yao
(74) Attorney, Agent, or Firm—Ronald P. Kananen; Rader, Fishman & Grauer PLLC

(57) ABSTRACT

Disclosed is a method of accurately, simply forming a light absorbing layer for improving contrast in a transmission screen including micro glass beads two-dimensionally arranged. A light absorbing layer made from toner is formed on glass beads held in a transparent adhesive layer up to a thickness sufficient to cover the glass beads. The light absorbing layer is irradiated with parallel rays of light in the direction from a transparent substrate, to melt and remove only a portion of the light absorbing layer positioned over a light outgoing portion of each glass bead by the energy of the rays of light converged through the glass bead. By suitably selecting a material of the light absorbing layer, openings can be formed in the light absorbing layer by means of combustion, sublimation or ablation due to the energy of the converged rays of light. Further, a light absorbing layer having each opening positioned only over a light outgoing portion of each glass bead can be formed by making use of a photosensitive material.

3 Claims, 22 Drawing Sheets

METHOD OF MANUFACTURING PLANO LENS

This application is a divisional of application Ser. No 09/148,710 filed Sep. 4, 1998 now U.S. Pat. No. 6,096,159.

BACKGROUND OF THE INVENTION

The present invention relates to a method of manufacturing a plano lens, particularly, suitable for use in a screen of a back projection type projector.

In recent years, as a large screen display used for a high definition television or a theater, a back projection type projector using a liquid crystal light bulb or a CRT has been actively developed.

FIG. 30 shows a schematic configuration of a related art back projection type projector.

Referring to FIG. 30, there is shown a box type projector in which image light L projected from an image projecting unit 101 is reflected by a reflecting mirror 102 to be introduced to a transmission screen 105. The transmission screen 105 is composed of a Fresnel lens 103 which is generally combined with a vertically extending lenticular lens 104. Image light L incident on the backface of the transmission screen 105 is substantially collimated through the Fresnel lens 103, and the parallel rays of image light L are diffused mainly in the horizontal direction through the lenticular lens 104.

As shown in FIGS. 31A and 31B, the lenticular lens 104 has on its back side (light outgoing side) vertically extending projections 104a on which are provided black stripes 104b for absorbing external light thereby improving the screen contrast. For example, an acrylic resin is extrusion-molded into the shape of the lenticular lens 104 including the projections 104a, followed by printing of only the projections 104a with a black color, to form the black stripes 104b.

As shown in FIG. 31B, a width "w" of each black stripe 104b is, generally, set at a value being 0.3 to 0.4 time an arrangement pitch "p" of the projections 104a of the lenticular lens 104.

The transmission screen using the above lenticular lens has a disadvantage that it allows diffusion of rays of light in a wide range in the horizontal direction, leading to a wide viewing angle in the horizontal direction; however, it allows diffusion of rays of light only in a narrow range in the vertical direction, leading to a narrow viewing angle in the vertical direction. To solve such a disadvantage, there has been known a structure having a vertically extending lenticular lens combined with a horizontally extending lenticular lens. Such a structure, however, has problems that the increased number of the parts raises the parts cost and manufacturing cost, the increased number of the stacked lenticular lens layers of the screen thickens the screen, and the influence of multiple reflection between the lenticular lens layers becomes larger.

The transmission screen using the lenticular lens has another disadvantage. To provide the black stripes for improving contrast as described above, the projections for printing a black color must be formed on the light outgoing side of the lenticular lens, and in this case, the width of each projection must be set at such a value as not to interfere with rays of outgoing light. Consequently the area ratio of an external light absorbing unit composed of the black stripes is generally set at about 30 to 40%, and thereby the effect of improving contrast is relatively poor.

To cope with the above disadvantage, attention has been given to a transmission screen using a plano lens with minute transparent balls two-dimensionally arranged in place of the above lenticular lens (for example, disclosed in U.S. Pat. Nos. 2,378,252 and 3,552,822, and Japanese Utility Model Registration No. 2513508). Such a transmission screen using a plano lens has been studied to be practically used for a high definition large screen display.

A configuration of the above transmission screen using a plano lens, having been proposed by the present applicant in Japanese Patent Laid-open No. Hei 9-100590 (filed on Apr. 17, 1997), will be described with reference to FIGS. 32 to 34.

FIG. 32 shows a main configuration of a back projection type projector of an open type in which rays of image light L projected from an image projecting unit 21 are diffused forward via a transmission screen 10 composed of a Fresnel lens 22 and a plano lens 23. As shown in the figure, the plano lens 23 is configured such that minute transparent balls 2 are two-dimensionally disposed in a closet packing array. Accordingly, only one layer of the minute transparent balls 2 allows rays of the image light L to be diffused in a wide range in each of the horizontal and vertical directions.

FIG. 33 shows a back projection type projector of a box type in which image light L projected from an image projecting unit 21 disposed in a housing 25 is reflected by a reflecting mirror 24 and is diffused forward via a transmission screen 10 having a Fresnel lens 22 and a plano lens 23 composed of minute transparent balls 2.

FIG. 34 shows one example of a configuration of the above plano lens 23.

The plano lens 23 is configured such that a number of minute transparent balls 2 such as glass beads are held in a transparent adhesive layer 5 formed on a light incoming side transparent substrate 4 with about 50% of the diameter of each minute transparent ball 2 buried in the transparent adhesive layer 5. A light absorbing layer (coloring layer) 3 made from carbon toner is formed such that gaps between respective adjacent ones of the minute transparent balls 2 are filled with the light absorbing layer 3 and the top and its neighborhood of each minute transparent ball 2 on the light outgoing side are exposed from the light absorbing layer 3. On the minute transparent balls 2 on the light outgoing side is stacked a transparent substrate 1 via a transparent adhesive layer in order to protect the minute transparent balls 2 and the light absorbing layer 3 from the external environment.

Rays of incoming light $L_{in}$, which have been made incident on the plano lens 23 via the Fresnel lens (not shown), pass through the transparent substrate 4 and the transparent adhesive layer 5 on the light incoming side and are converged through each minute transparent ball 2, as shown in FIG. 34; and the converged rays of light pass through the top and its neighborhood of each minute transparent ball 2 on the light outgoing side and also pass through the transparent adhesive layer 6 and the transparent substrate 1 on the light outgoing side, and go out of the plano lens 23 as diffused rays of outgoing light $L_{out}$. On the other hand, rays of external light $L_{ex}$, having been made incident on the plano lens 23 from the transparent substrate 1 side are almost absorbed by the light absorbing layer 3, to thereby reduce lowering of contrast due to reflectance of the rays of external light $L_{ex}$.

At this time, in the plano lens 23, the area ratio of the light absorbing layer 3 on the light outgoing side can be set at about 80% or more, so that lowering of the contrast due to reflectance of the external light $L_{ex}$ can be significantly reduced. Thus a screen having a high contrast, being less affected by external light, can be realized.

The plano lens 23 is manufactured, for example, as follows.

The transparent adhesive layer 5 is formed on the transparent substrate 4 on the light incoming side and a number of the minute transparent balls are scattered on the transparent adhesive layer 5. The minute transparent balls 2 are pressed down such that about a half of the diameter of each minute transparent ball 2 is buried in the transparent adhesive layer 5. A powdery light absorbing material such as carbon toner is scattered over the surface of the minutes transparent balls and is pressed thereon by, for example, a pressing roll to fill gaps between respective adjacent ones of the minute transparent balls 2, to form a light absorbing layer 3. Then, part of the light absorbing material present on the tops and their neighborhoods of the minute transparent balls 2 on the light outgoing side is wiped off, to form light outgoing portions of the minute transparent balls 2. After that, a transparent substrate 1 is stacked on the light outgoing side via a transparent adhesive layer 6.

The above manufacturing method, however, has a disadvantage. Since there may occur slight inevitable variations in diameter and buried depth of the minute transparent balls 2, it is difficult to accurately remove part of the light absorbing material on the light outgoing portions of the minute transparent balls 2. As a result, the transmission screen 10 using the related art plano lens 23 is relatively large in brightness and unevenness of contrast.

Another problem of the related art method is to require a lot of labor and working time for wiping off the light absorbing material.

SUMMARY OF THE INVENTION

An object of the present invention is to provide a method of manufacturing a plano lens capable of simply, accurately removing a portion of a light absorbing material positioned over a light outgoing portion of each of minute transparent ball.

To achieve the above object, according to a first aspect of the present invention, there is provided a method of manufacturing a plano lens, including the steps of: forming a transparent adhesive layer on a transparent substrate; supplying a plurality of minute transparent balls on the transparent adhesive layer and burying the minute transparent balls in the transparent adhesive layer up to a specific depth; forming a light absorbing layer up to a thickness sufficient to fill gaps between respective adjacent ones of portions, exposed from the transparent adhesive layer, of the plurality of minute transparent balls and further to cover the plurality of minute transparent balls; and radiating parallel rays of light from the transparent substrate side, to remove a portion of the light absorbing layer positioned over a light outgoing portion of each of the minute transparent balls.

The above step of removing a portion of the light absorbing layer may include the steps of: melting the portion of the light absorbing layer positioned over the light outgoing portion of each of the minute transparent balls by the energy of the rays of light converged through the minute transparent ball; and removing the melted portion of the light absorbing layer by rendering the melted portion absorbed in a sheet member.

The above method may further include the step of stacking, after the step of removing a portion of the light absorbing layer, a second transparent substrate on the light absorbing layer via a second transparent adhesive layer.

The above step of removing a portion of the light absorbing layer may include the step of: removing the portion of the light absorbing layer positioned over the light outgoing portion of each of the minute transparent balls by combustion, sublimation, or ablation due to the energy of the rays of light converged through the minute transparent ball.

In the above method, the light absorbing layer may be made from a resin composition containing carbon and nitrocellulose.

According to a second aspect of the present invention, there is provided a method of manufacturing a plano lens, including the steps of: forming a first transparent adhesive layer on a transparent substrate; supplying a plurality of minute transparent balls on the first transparent adhesive layer and burying the minute transparent balls in the first transparent adhesive layer up to a specific depth; forming a second transparent adhesive layer, which loses its adhesiveness when exposed to light, up to a thickness sufficient to fill gaps between respective adjacent ones of portions, exposed from the first transparent adhesive layer, of the plurality of minute transparent balls and further to cover the plurality of minute transparent balls; radiating parallel rays of light from the transparent substrate side, to expose a portion of the second transparent adhesive layer positioned over a light outgoing portion of each of the minute transparent balls to the rays of light converged through the minute transparent ball; and forming a light absorbing layer on non-exposed portions of the second transparent adhesive layer.

In the above method, ultraviolet rays may be used as the rays of light to which a portion of the second transparent adhesive layer is exposed.

The above method may further include the step of: stacking, after the step of forming the light absorbing layer, a second transparent substrate on the light absorbing layer via a third transparent adhesive layer.

According to a third aspect of the present invention, there is provided a method of manufacturing a plano lens, including the steps of: forming a transparent adhesive layer on a transparent substrate; supplying a plurality of minute transparent balls on the transparent adhesive layer and burying the minute transparent balls in the transparent adhesive layer up to a specific depth; forming a light absorbing layer, which is made soluble in a specific solvent when exposed to light, up to a thickness sufficient to fill gaps between respective adjacent ones of portions, exposed from the transparent adhesive layer, of the plurality of minute transparent balls and further to cover the plurality of minute transparent balls; radiating parallel rays of light from the transparent substrate side, to expose a portion of the light absorbing layer positioned over a light outgoing portion of each of the minute transparent balls to the rays of light converged through the minute transparent ball; and removing the exposed portions of the light absorbing layer by dissolving them with the solvent.

In the above method, ultraviolet rays may be used as the rays of light to which a portion of the light absorbing layer is exposed.

The above method may further include the step of: stacking, after the step of removing the exposed portions of the light absorbing layer, a second transparent substrate on the light absorbing layer via a second transparent adhesive layer.

As described above, according to the present invention, in manufacture of a plano lens including a plurality of minute transparent balls, rays of light are allowed to pass through the minute transparent balls along paths being substantially the same as the actual paths of the plano lens so that only a portion of a light absorbing layer positioned over a light outgoing portion of each of the minute transparent balls is selectively exposed to the rays of light to be removed, to thereby form an opening of the light absorbing layer only over the light outgoing portion of each of the minute transparent balls.

Accordingly, even if there are present slight variations in diameter of the minute transparent balls, it is possible to accurately, simply form the openings of the light absorbing layer only over the light outgoing portions of the minute transparent balls. As a result, the use of the plano lens thus manufactured in accordance with the method of the present invention realizes an excellent transmission screen less in unevenness of brightness and contrast.

As compared with the method in which portions of a light absorbing layer over light outgoing portions of minute transparent balls are removed by wiping, the manufacturing method of the present invention is allowed to significantly reduce working labor and shorten working time.

DETAILED DESCRIPTION OF THE PREFERRED EMBODIMENTS

Hereinafter, preferred embodiments of the present invention will be described with reference to the accompanying drawings.

Figure 32:
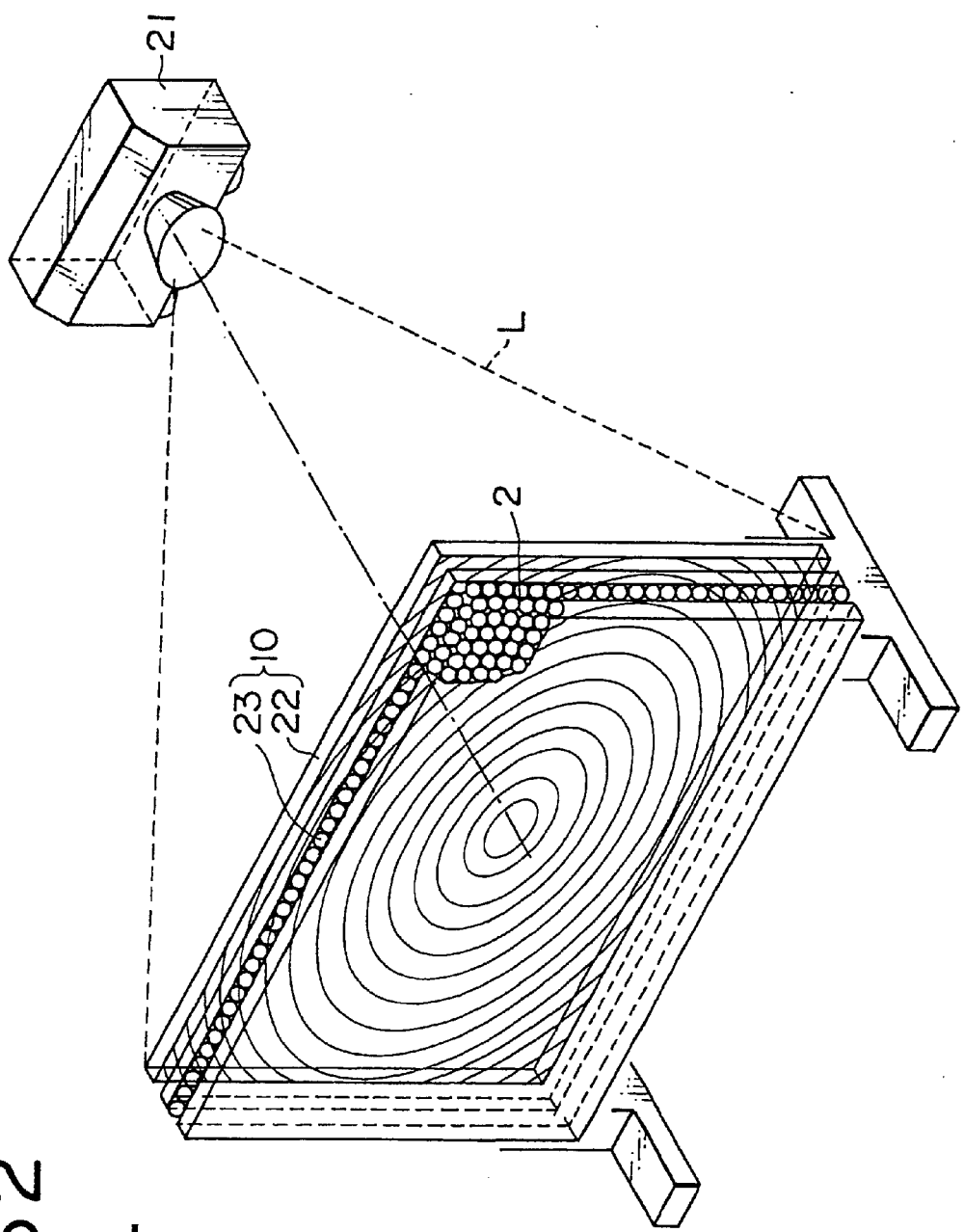
FIG. 32 is a schematic view showing a back projection type projector of an open type, using a plano lens composed of minute transparent balls.
Figure 33:
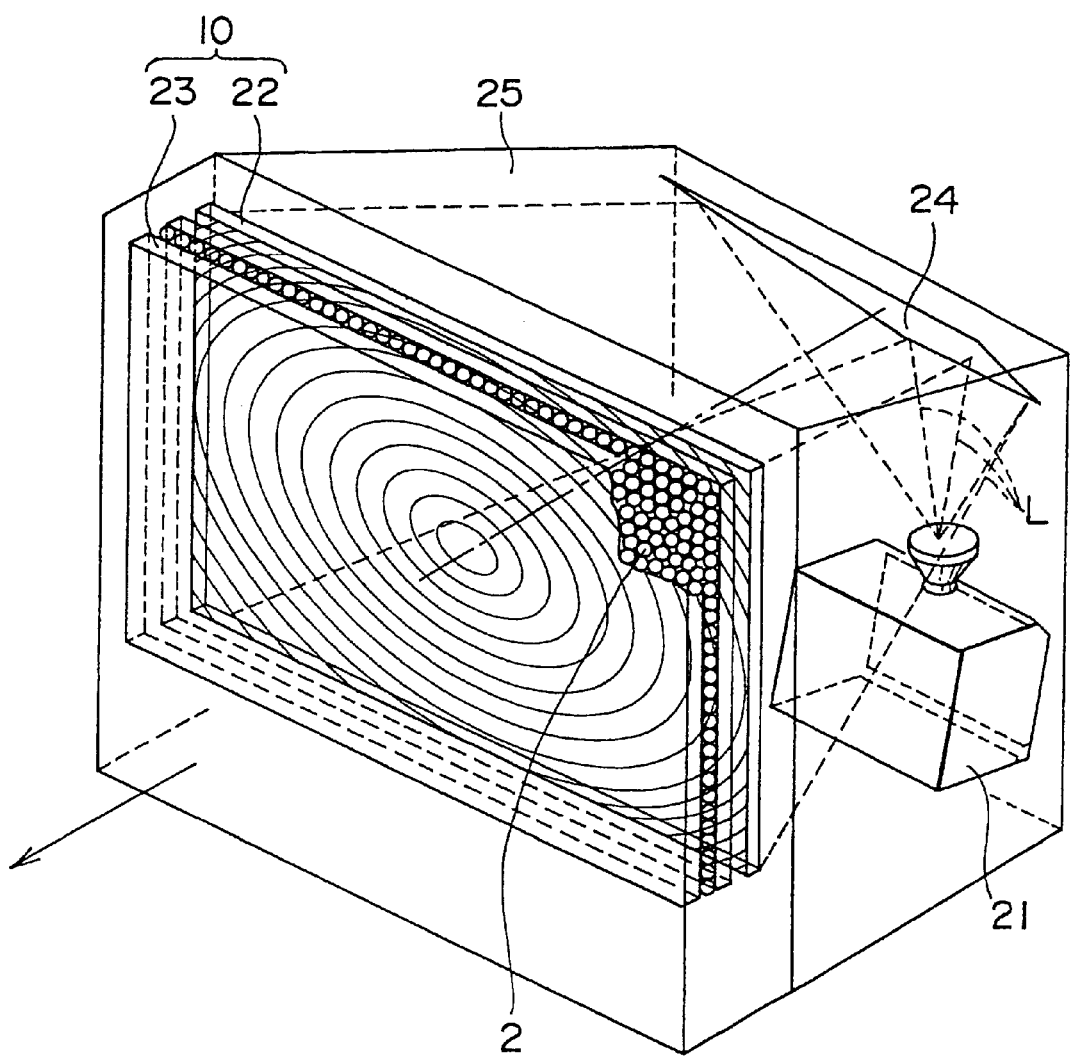
FIG. 33 is a schematic view showing a back projection type projector of a box type, using a plano lens composed of minute transparent balls.
Figure 34:
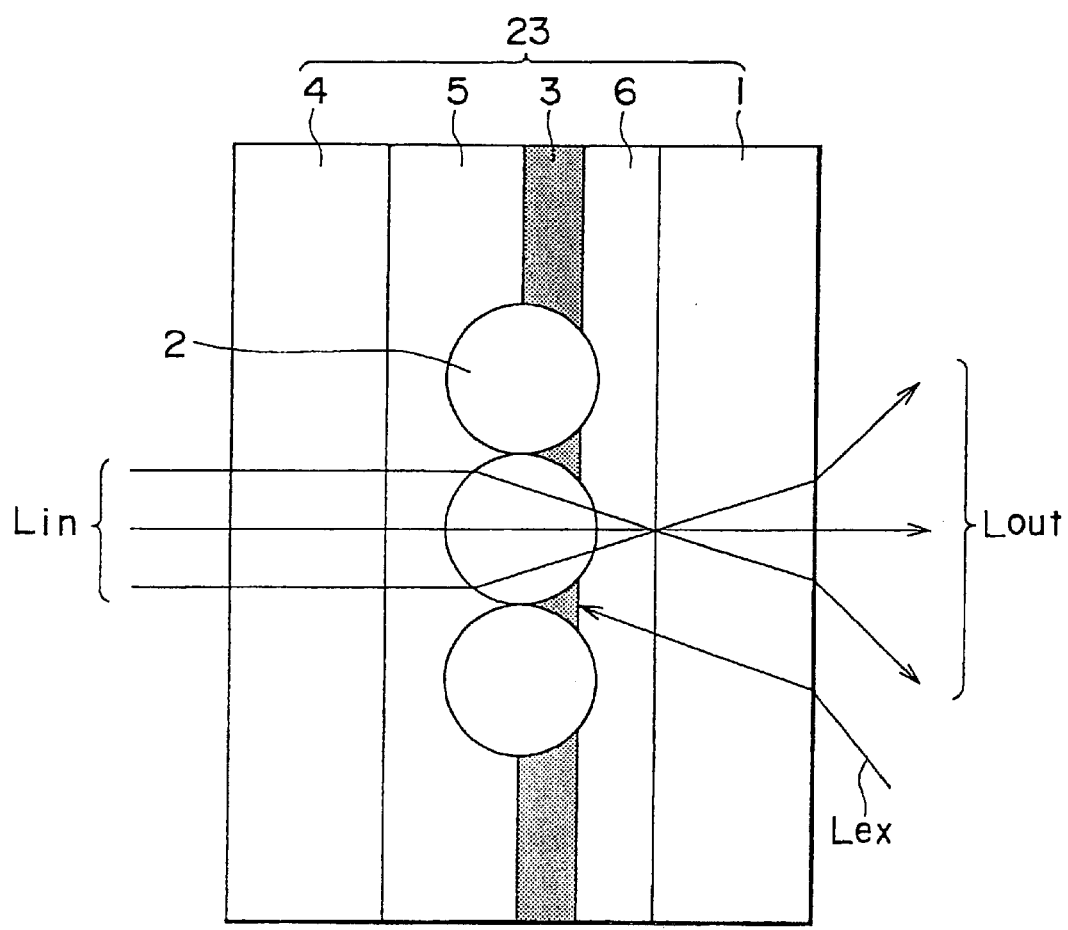
FIG. 34 is a schematic sectional view showing a configuration of a plano lens composed of minute transparent balls.

In the following embodiments, parts corresponding to those shown in FIGS. 32 to 34 are indicated by the same reference numerals as those in FIGS. 32 to 34.

[Embodiment 1]

A method of manufacturing a plano lens according to a first embodiment of the present invention will be described with reference to FIGS. 3A to 3C, FIGS. 4A to 4D, FIGS. 5A to 5C, and FIGS. 6A to 6C.

Figure 3A:
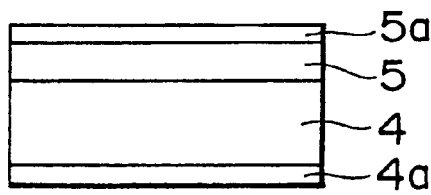
FIGS. 3A to 3C are schematic views showing the method of manufacturing the plano lens according to the first embodiment of the present invention in the order of manufacturing steps.

At step shown in FIG. 3A, a transparent adhesive layer 5 is formed on a transparent substrate 4 on the light incoming side. For example, an ultraviolet (UV) cured type acrylic resin sheet 5 with a protective film 5a is stuck on the transparent substrate 4 made from an acrylic resin such as polymethyl methacrylate (PMMA). Reference numeral 4a indicates a protective film for protecting the back side of the transparent substrate 4.

Each of the substrate 4 and the adhesive layer 5 is not necessarily transparent insofar as it allows most of specified rays of light to pass therethrough, and therefore, the term "transparency" in this specification is used as the wide sense of transparency including so-called semi-transparency.

While the transparent substrate 4 is made from an acrylic resin such as PMMA in the above example, it may be composed of a rigid glass substrate or a rigid or flexible plastic substrate. Specific examples of the plastic materials other than the above acrylic resin may include a polycarbonate resin, polyolefine resin, vinyl chloride resin, polystyrene resin, polyethylene resin, epoxy resin, polyarylate resin, polyethersulfone resin, silicone resin, and polyethylene terephthalate resin.

The transparent adhesive layer 5 is required to allow a number of minute transparent balls to be buried therein and also required to certainly fix and hold the balls buried therein. Accordingly, the transparent adhesive layer 5 is preferably made from an UV cured type acrylic resin which has a softness sufficient to allow easy burying of the minute transparent balls before photo-curing of the resin and which has a hardness sufficient to certainly fix and hold the balls buried in the resin after photo-curing of the resin. The layer 5, however, may be made from a material selected from other type acrylic resins, polycarbonate resin, polyolefine resin, vinyl chloride resin, polystyrene resin, polyethylene resin, epoxy resin, polyarylate resin, polyethersulfone resin, silicone resin, and polyethylene terephthalate resin.

Figure 3B:
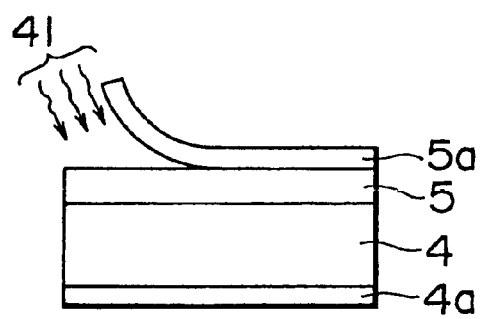

Then, at step shown in FIG. 3B, the protective film 5a is peeled from the transparent adhesive layer 5 while electrostatic charges are neutralized by performing charge removing blow 41 and dust is sucked.

Figure 3C:
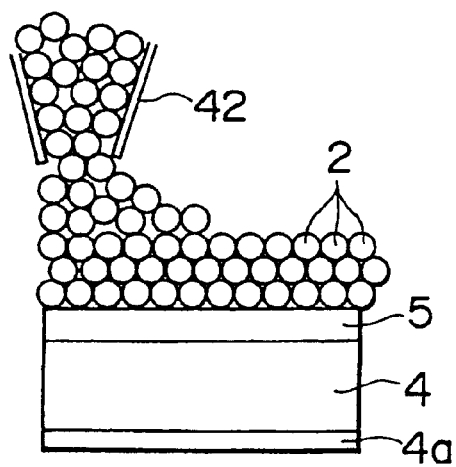

At step shown in FIG. 3C, a number of minute transparent balls 2, typically glass beads, are supplied from a hopper 42 on the transparent adhesive layer 5.

The minute transparent balls 2 may be made from a plastic material such as an acrylic resin or polystyrene resin, in addition to the above-described glass.

The refractive index of each minute transparent ball 2 is set at a value being at least larger than that of the transparent adhesive layer 5 which is in contact with the minute transparent ball 2 on the light incoming side, for example, 1.4 or more.

The diameter "d" of each minute transparent ball 2 is set in a range of 50 to 100 $\mu$m. If the diameter "d" is excessively large, each gap between adjacent ones of the minute transparent balls 2 becomes excessively large. This may reduce a resolution of a screen of a back projection type projector manufactured using a plano lens including these minute transparent balls 2.

A variation in diameter of the minute transparent balls 2 is set in a range of 10% or less of the average diameter of the balls. If the variation is excessively large, it may be difficult to uniformly distribute the minute transparent balls 2.

Figure 4A:
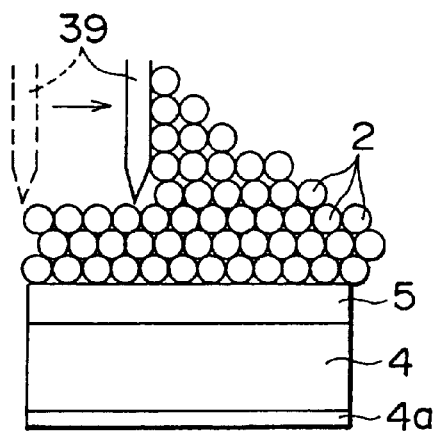
FIGS. 4A to 4D are schematic views, continued from FIGS. 3A to 3C, showing the method of manufacturing the plano lens according to the first embodiment of the present invention in the order of manufacturing steps.

The process goes on to step shown in FIG. 4A at which the heights of the stacked minute transparent balls 2 are equalized by squeegeeing using a doctor blade 39.

Figure 4B:
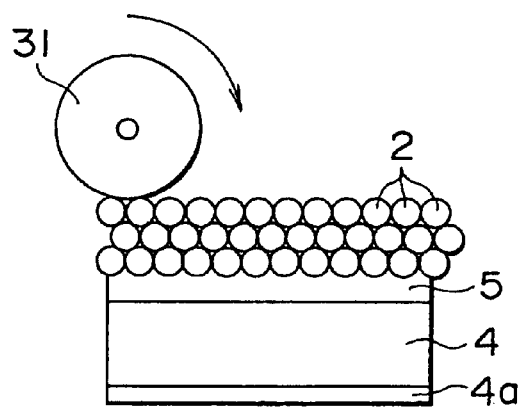

At step shown in FIG. 4B, the minute transparent balls 2 are pressed down by a pressing roll 31 made from silicon rubber to bury the minute transparent balls at the lowermost layer in the transparent adhesive layer 5.

The buried depth of each of the minute transparent balls 2 buried in the transparent adhesive layer 5 is set in a range of 30% or more, preferably, about 50% of the average diameter of the minute transparent balls 2. With this configuration, each minute transparent ball 2 is certainly fixed and held by the transparent adhesive layer 5, and also the quantity of rays of light incident on each minute transparent ball 2 becomes large which, for example, leads to the increased brightness of a screen of a back projection type projector using a plano lens including the minute transparent balls 2.

Figure 4C:
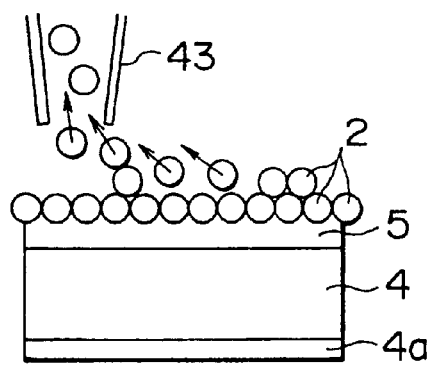

At step shown in FIG. 4C, the unnecessary minute transparent balls 2 having not buried in and held by the transparent adhesive layer 5 are sucked and removed by an evacuating means 43.

Figure 4D:
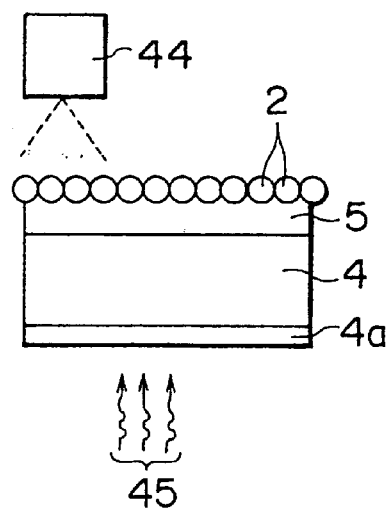

Then, at step shown in FIG. 4D, the filling state of the minute transparent balls 2 is checked using a camera 44, and thereafter, the transparent adhesive layer 5 made from the UV cured type resin is cured by ultraviolet irradiation 45 to fix each minute transparent ball 2 in the transparent adhesive layer 5.

Figure 5A:
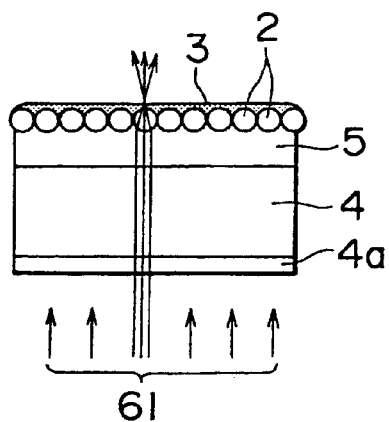
FIGS. 5A to 5C are schematic views, continued from FIGS. 4A to 4D, showing the method of manufacturing the plano lens according to the first embodiment of the present invention in the order of manufacturing steps.

The process goes on to step shown in FIG. 5A at which a light absorbing layer 3 made from the same black toner as that used for electrophotography or the like is formed up to a thickness sufficient to fill gaps between respective adjacent ones of the minute transparent balls 2 and further to substantially perfectly cover the minute transparent balls 2. Then, parallel rays 61 of light (or rays of light equivalent thereto) are radiated from a halogen lamp, xenon electronic-flash lamp or a laser to the light absorbing layer 3 in the direction shown by arrows, that is, from the transparent substrate 4 side.

Figure 1A:
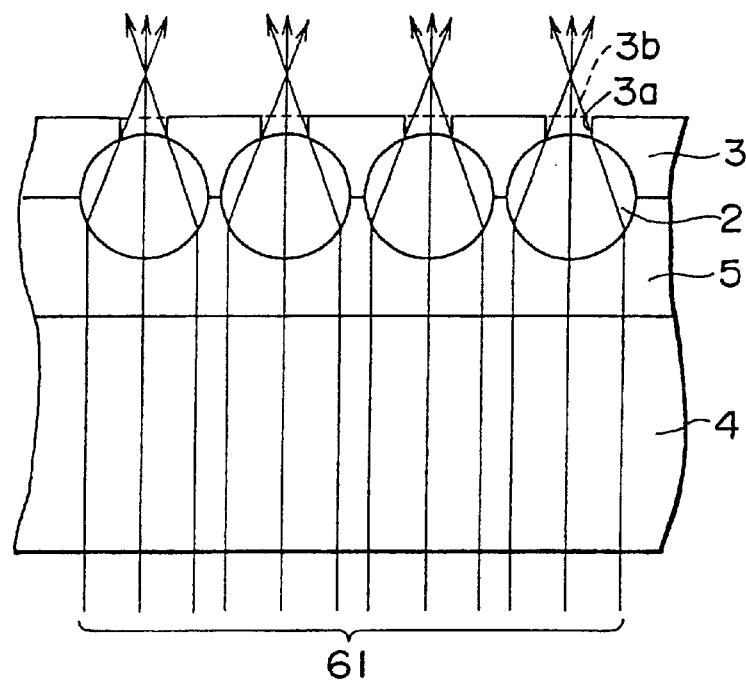
FIGS. 1A and 1B are a schematic sectional view and a plan view showing a method of manufacturing a plano lens according to a first embodiment of the present invention, respectively.

At this time, as shown on an enlarged scale in FIG. 1A, the parallel rays 61 of light are converged by the lens action of each minute transparent ball 2, and on the light outgoing side of the minute transparent ball 2, the rays 61 of light are focussed substantially only at a specific portion 3b of the light absorbing layer 3 positioned over the light outgoing portion of the minute transparent ball 2. Consequently, only the portion 3b of the light absorbing layer 3 is locally heated and melted by the energy of the focussed rays of light.

Figure 5B:
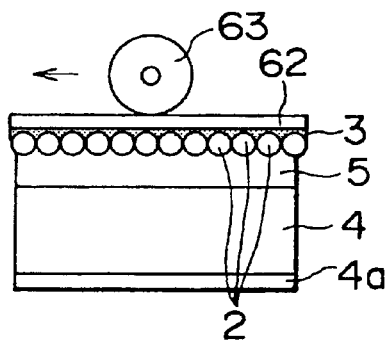
Figure 5C:
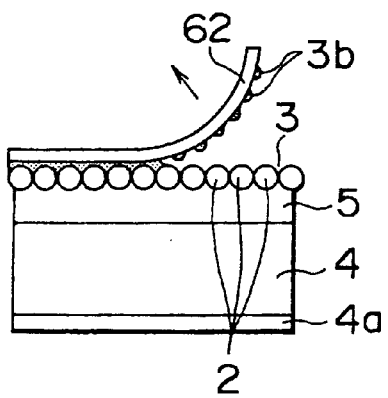

Then, at step shown in FIG. 5B, directly after or during irradiation of the rays of light 61, a toner absorbing sheet 62 such as a paper sheet is pressed on the light absorbing layer 3 by a pressing roll 63. At step shown in FIG. 5C, the toner absorbing sheet 62 is peeled so that only the melted portions 3b of the light absorbing layer 3 are absorbed and removed by the toner absorbing sheet 62. In addition, the rays 61 of light may be radiated in a state in which the toner absorbing sheet 62 has been previously pressed on the light absorbing layer 3.

Figure 1B:
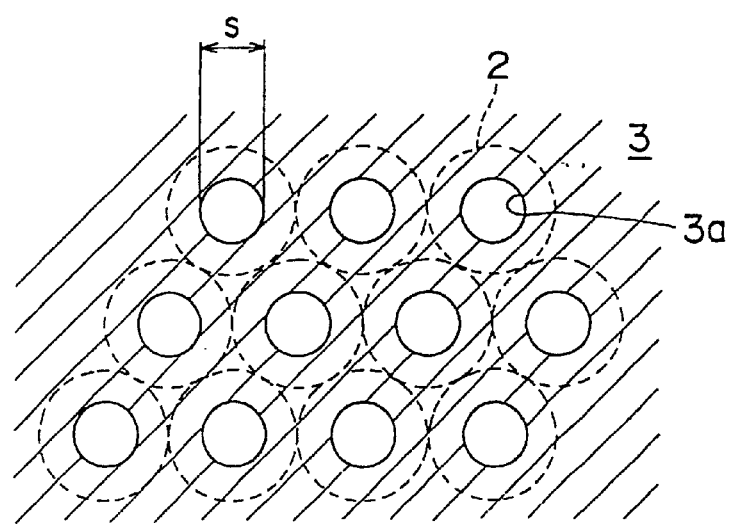

In this way, there can be obtained the light absorbing layer 3, as shown by a plan view of FIG. 1B, in which openings 3a are formed only over the light outgoing portions of the minute transparent balls 2. In addition, character "s" indicates a diameter of the opening 3a.

Figure 2:
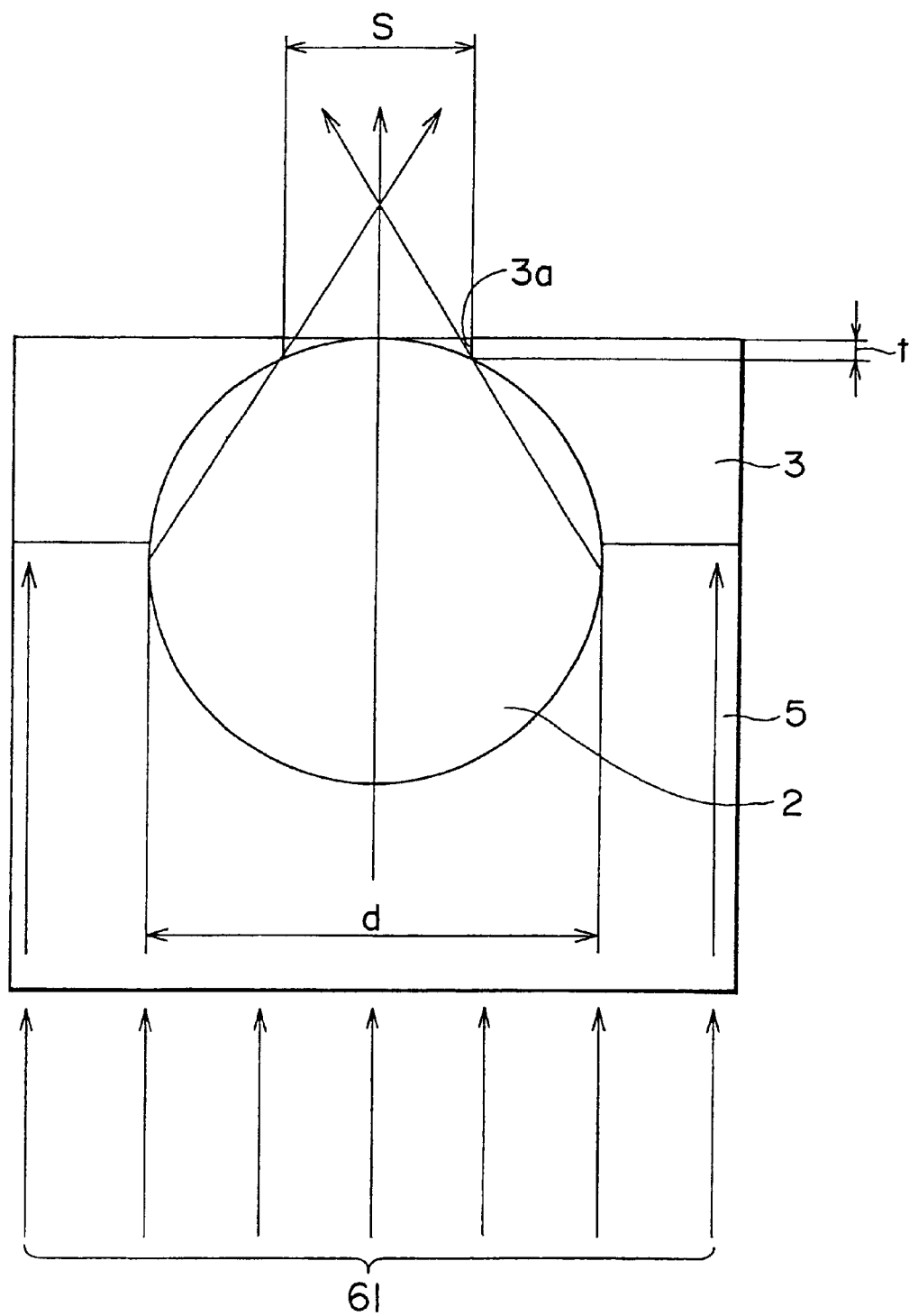
FIG. 2 is a typical view showing a result of light ray tracking simulation of the plano lens manufactured in accordance with the first embodiment of the present invention.

The result of light ray tracking simulation at one minute transparent ball 2 and its neighborhood will be described with reference to FIG. 2.

For example, it is assumed that parallel rays 61 of light, having passed air and the transparent adhesive layer 5 having a refractive index n=1.5, are made incident on one minute transparent ball 2 formed of a glass bead having a diameter d=50 $\mu$m and a refractive index n=1.9. It is to be noted that the transparent substrate 4, which is actually present between the transparent adhesive layer 5 and air, is neglected here because it may be generally made from a material having a refractive index nearly equal to that of the transparent adhesive layer 5.

When the parallel rays 61 having a light flux equivalent to the diameter d=50 $\mu$m of the minute transparent ball 2 are made incident on the minute transparent ball 2 as effective rays of light, the rays 61 of light are converged in a range of the diameter "s" of the opening 3a ($\approx$20 $\mu$m) on the opposed side (light outgoing side) of the minute transparent ball 2, and are diffused. The diameter "s"$\approx$20 $\mu$m corresponds to a thickness "t"$\approx$2 $\mu$m based on the top of the minute transparent ball 2 on the light outgoing side.

At this time, the area ratio between the light flux on the light incoming side of the minute transparent ball 2 and the light flux on the light outgoing side of the minute transparent ball 2 becomes $(d=50)^2:(s=20)^2=25:4$, that is, about 6.1. Accordingly, letting A $[J/m^2]$ be the energy per unit area of the parallel rays 61 of light coming in the minute transparent ball 2, the rays 61 of light having an energy density which is about six times that on the incoming side, that is, 6 A $J/m^2$ go out of the minute transparent ball 2. Even if the diameter of the light flux of the effective rays of light on the incoming side is 40 $\mu$m and the diameter of the light flux of the effective rays of light on the outgoing side is 20 $\mu$m, the rays of light having an energy density which is four times that on the incoming side, that is, 4 A $J/m^2$ go out of the minute transparent ball 2.

As a result, by selecting a material of the light absorbing layer 3 and also setting the irradiation energy and the irradiation time of the parallel rays 61 of light so that the light absorbing layer 3 is not significantly melted at the energy density A $J/m^2$, but is melted at the energy density of 4 A to 6 A $J/m^2$, it is possible to melt only the portions of the light absorbing layer 3 positioned over the light outgoing portions of the minute transparent balls 2 with effect little exerted on other portions of the light absorbing layer 3.

The above method of forming the light absorbing layer 3 makes it possible to accurately, simply form the openings 3a over the actual outgoing portions of the minute transparent balls 2 even if there are, present variations in diameter and buried height of the minute transparent balls 2. The use of the plano lens thus manufactured in accordance with the method of the present invention realizes an excellent transmission screen less in unevenness of brightness and contrast.

Figure 6A:
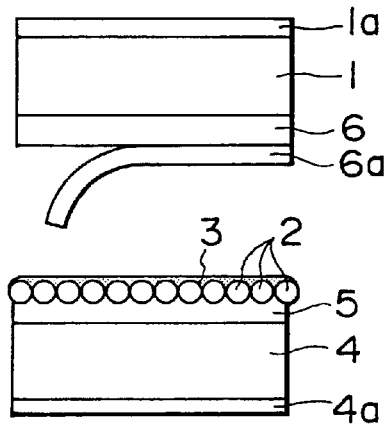
FIGS. 6A to 6C are schematic views, continued from FIGS. 5A to 5C, showing the method of manufacturing the plano lens according to the first embodiment of the present invention in the order of manufacturing steps.

The process goes on to step shown in FIG. 6A at which the formation state of the light absorbing layer 3 is checked by a camera (not shown), and a protective film 6a is peeled from a transparent adhesive layer 6 formed on a transparent substrate 1 on the light outgoing side and the transparent substrate 1 is stacked on the light absorbing layer 3. Reference numeral 1a indicates a protective film provided on the back side of the transparent substrate 1.

The transparent substrate 1 and the transparent adhesive layer 6 on the light outgoing side may be made from the same materials as those of the transparent substrate 4 and the transparent adhesive layer 5 on the light incoming side, respectively. For example, the transparent substrate 1 may be formed of the above-described acrylic resin sheet and the transparent adhesive layer 6 is made from the above-described UV cured type acrylic resin.

Figure 6B:
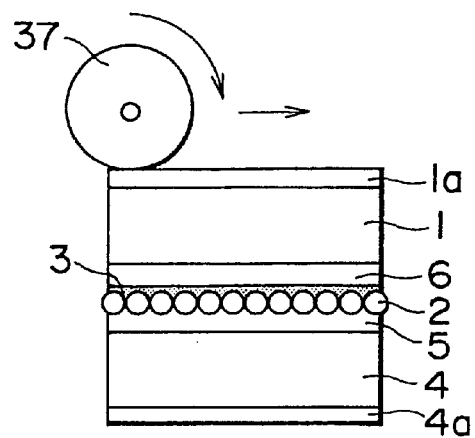

At step shown in FIG. 6B, the transparent substrate 1 is press-bonded on the minute transparent balls 2 and the light absorbing layer 3 formed on the transparent substrate 4 via the transparent adhesive layer 6 by a pressing roll 37.

Figure 6C:
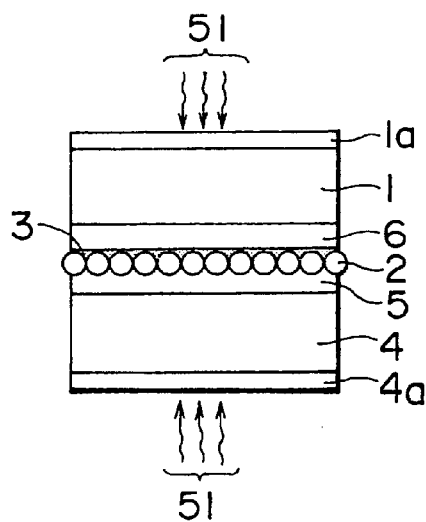

Then, at step shown in FIG. 6C, the transparent adhesive layer 6 is cured by ultraviolet rays 51, to increase the bonding strength of the transparent adhesive layer 6.

It is to be noted that if the transparent adhesive layer 5 on the light incoming side is made from a material capable of sufficiently fixing and holding the minute transparent balls 2 before UV curing thereof, the final UV curing of the transparent adhesive layer 5 may be performed together with the UV curing of the transparent adhesive layer 6 at this step shown in FIG. 6C.

The protective films 1a and 4a are then peeled, to thus obtain a plano lens.

In the plano lens thus manufactured, each of the openings 3a, which are provided at the portions of the light absorbing layer 3 positioned over the light outgoing portions of the minute transparent balls 2, is formed into a somewhat deep hole as shown in FIGS. 1A and 1B.

[Embodiment 2]

Figure 7A:
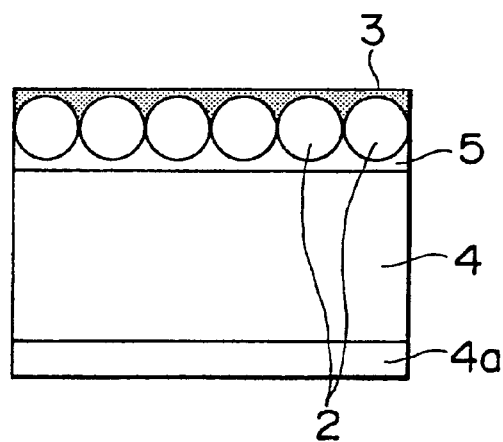
FIGS. 7A and 7B are schematic views showing a method of manufacturing a plano lens according to a second embodiment of the present invention in the order of manufacturing steps.
Figure 7B:
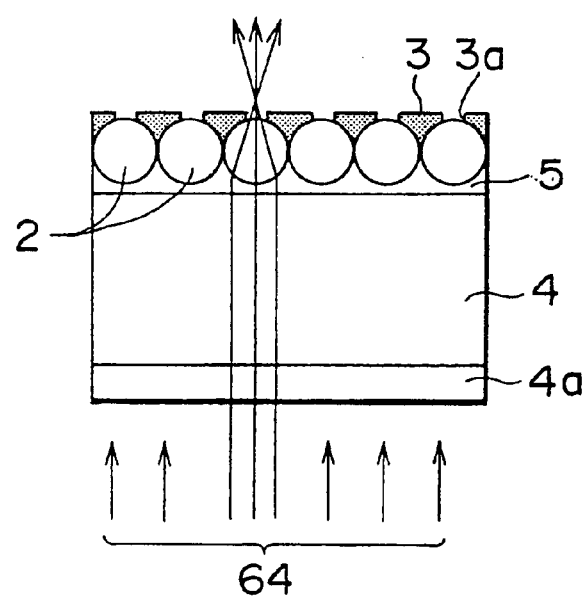

FIGS. 7A and 7B show a method of manufacturing a plano lens according to a second embodiment of the present invention.

In the second embodiment, minute transparent balls 2 are buried and fixed in a transparent adhesive layer 5 by repeating the steps from that shown in FIG. 3A to that shown in FIG. 4D in the first embodiment, and as shown in FIG. 7A, a light absorbing layer 3 is formed up to a thickness sufficient to substantially perfectly cover the minute transparent balls 2.

Then, at step shown in FIG. 7B, parallel rays 64 of light (or rays of light equivalent thereto) are radiated from the transparent substrate 4 side, to remove a portion of the light absorbing layer 3 over a light outgoing portion of each minute transparent ball 2 by combustion, sublimation, or ablation due to the energy of the rays of light converged to the above portion of the light absorbing layer 3 through the minute transparent ball 2, thereby forming an opening 3a.

In the case of forming the openings 3a mainly by combustion, a black resin layer mainly containing carbon (carbon black) and nitrocellulose is formed, as the light absorbing layer 3, by coating and is irradiated with the parallel rays 64 of light (or rays of light equivalent thereto) generated by an excimer laser, semiconductor laser, or the like. At this time, since the combustion of the above nitrocellulose explosively occurs, there remains very little combustion residue. If combustion residue remains in the case of using another combustion assistant, it may be removed by cleaning or the like.

In the case of forming the openings 3a mainly by sublimation, the light absorbing layer 3 made from sublimable toner or sublimable ink is formed by press-filling or coating, and is irradiated with parallel rays 64 of light (or rays of light equivalent thereto) generated by a xenon electronic-flash lamp. At this time, it is desired to remove with certainty the sublimated toner or ink by rendering which was absorbed in a printing paper sheet or the like disposed opposite to the light absorbing layer 3.

The ablation is a phenomenon in which melted liquid is explosively scattered in the form of particulates by abrupt volume expansion. This may occur simultaneously with the above combustion or sublimation. In addition, the above combustion and sublimation may simultaneously occur.

In summary, in this embodiment, a portion of the light absorbing layer 3 irradiated with converged rays of light may be removed by vaporization due to combustion or sublimation or scattering due to ablation, and therefore, it is not important what is a main phenomenon by means of which the portion of the light absorbing layer 3 is removed.

Here, the energy of rays of light in the case of forming the opening 3a mainly by combustion will be examined.

In the case where a black sheet containing about 10 wt % of carbon black, about 20 wt % of nitrocellulose and about 70 wt % of a resin component is irradiated with a laser beam, the combustion depth is left as 0 $\mu$m at an energy density in a range of 0 to 2 mJ/m$^2$ (the energy is probably used only for heat generation of nitrocellulose or the like); and the combustion depth becomes large in proportional to the energy depth increased from a threshold value near 2 mJ/m$^2$, for example, about 1 $\mu$m for 5 mJ/m$^2$, about 3 $\mu$m for 10 mJ/m$^2$, and about 7 $\mu$m for 20 mJ/m$^2$.

In consideration of the fact that as described with reference to FIG. 2, the diameter "s"≈20 $\mu$m of the opening 3a over the light outgoing portion of the minute transparent ball 2 corresponds to the thickness "t"≈2 $\mu$m based on the top of the minute transparent ball 2 on the light outgoing side, the energy density A of the rays of light may be set such that the combustion depth becomes 0 $\mu$m at the energy density A and the combustion depth becomes 2 $\mu$m or more at the energy density 6 A. To satisfy the above condition, the energy density A of the rays of light may be in a range of 1.25 to 2 mJ/M$^2$.

However, actually, in consideration of the fact that the thickness of the light absorbing layer 3 on the minute transparent balls 2 is slightly larger than the above-described value, and that even if a portion of the light absorbing layer 3 between adjacent ones of the minute transparent balls 2 is burned somewhat, there is no problem for practical use because the light absorbing layer 3 is formed thickly, and further to cope with variations in buried depth and diameter of each minute transparent ball 2, the portion of the light absorbing layer 3 over the outgoing portion of each minute transparent ball 2 may be irradiated with rays of light having an energy density slightly larger than the value in the above range for certainly removing the portion.

After the openings 3a are formed in the light absorbing layer 3 as described above, the steps shown in FIGS. 6A to 6C in the first embodiment are repeated, to manufacture a plano lens.

The method of manufacturing a plano lens in the second embodiment is also allowed to accurately, simply form the openings 3a over the actual light outgoing portions of the minute transparent balls 2. The opening 3a is formed into a somewhat deep hole as shown in FIG. 7B.

[Embodiment 3]

FIGS. 8A to 8D show a method of manufacturing a plano lens according to a third embodiment of the present invention.

Figure 8A:
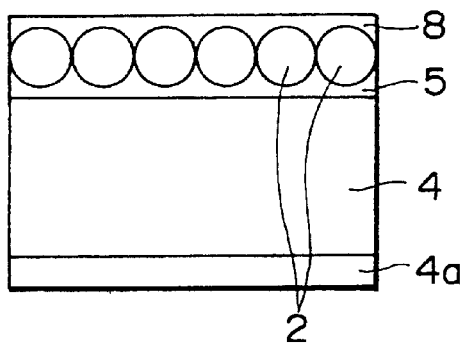
FIGS. 8A to 8D are schematic views showing a method of manufacturing a plano lens according to a third embodiment of the present invention in the order of manufacturing steps.

In the third embodiment, minute transparent balls 2 are buried and fixed in a transparent adhesive layer 5 by repeating the steps from that shown in FIG. 3A to that shown in FIG. 4D in the first embodiment, and as shown in FIG. 8A, a transparent adhesive layer 8 is formed up to a thickness sufficient to substantially perfectly cover the minute transparent balls 2. The transparent adhesive layer 8 is made from an UV sensitive resin (photopolymer) which loses adhesiveness when it is exposed to ultraviolet rays. The UV sensitive resin mainly contains epoxyacrylate and a photo polymerization initiator such as α, α-dimethoxy-α-phenylacetophenone, suitably incorporated with a sensitizer, a thermal polymerization inhibitor or the like.

Figure 8B:
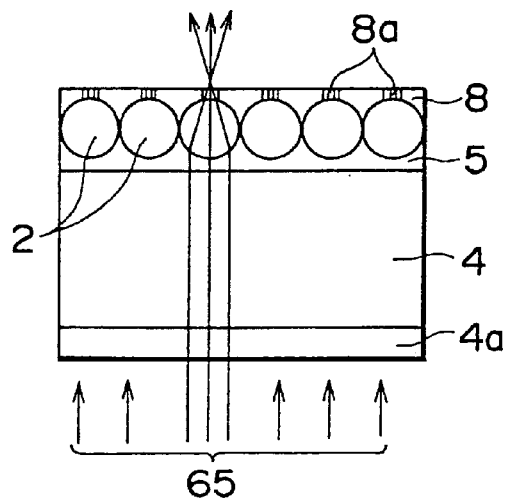

Then, at step shown in FIG. 8B, parallel rays 65 of ultraviolet (or rays of light equivalent thereto) are radiated from the transparent substrate 4 side, so that a portion 8a of the transparent adhesive layer 8 positioned over a light outgoing portion of each minute transparent ball 2 is exposed to the converged rays through the minute transparent ball 2 to lose the adhesiveness of the portion 8a. At this time, since the remaining portions of the transparent adhesive layer 8 other than the portions 8a are little irradiated with the rays of ultraviolet (or if they are irradiated with the rays of ultraviolet, the rays of ultraviolet are very weak), the remaining portions keep the adhesiveness.

Figure 8C:
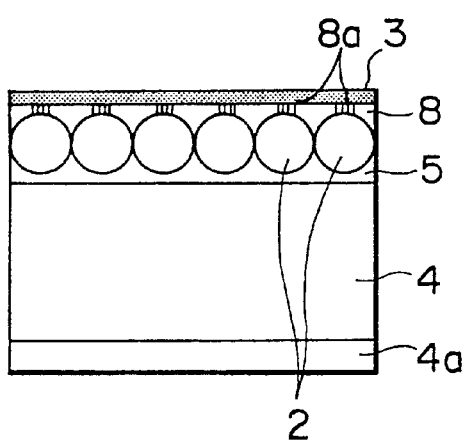

At step shown in FIG. 8C, a toner powder or ink sheet is brought in contact with the transparent adhesive layer 8 to form a light absorbing layer 3 made from the toner powder or ink. The toner powder or ink is weakly stuck on the portions 8a having little adhesiveness and is relatively strongly stuck on the remaining portions having adhesiveness.

Figure 8D:
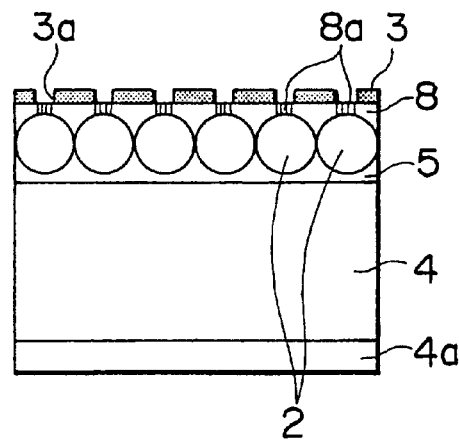

Accordingly, as shown in FIG. 8D, only the portions of the light absorbing layer 3 stuck on the portions 8a of the transparent adhesive layer 8 can be easily removed by cleaning or the like, whereby openings 3a of the light absorbing layers 3 can be formed only at the portions of the light absorbing layer 3 stuck on the portions 8a of the transparent adhesive layer 8, that is, only over the light outgoing portions of the minute transparent balls 2.

After that, the steps shown in FIGS. 6A to 6C in the first embodiment are repeated, to manufacture a plano lens.

The method of manufacturing a plano lens in the third embodiment is also allowed to accurately, simply form the openings 3a of the light absorbing layer 3 only over the actual light outgoing portions of the minute transparent balls 2. The opening 3a is formed into a somewhat deep hole as shown in FIG. 8D.

[Embodiment 4]

Figure 9A:
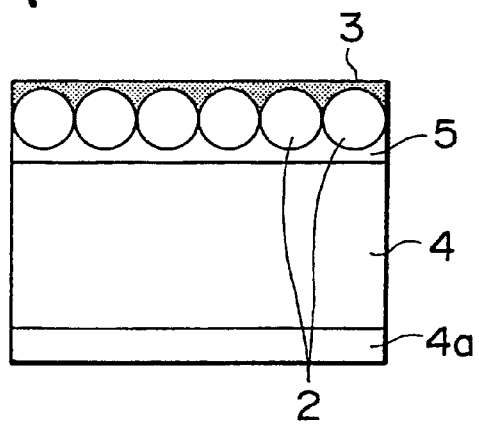
FIGS. 9A to 9C are schematic views showing a method of manufacturing a plano lens according to a fourth embodiment of the present invention in the order of manufacturing steps.
Figure 9B:
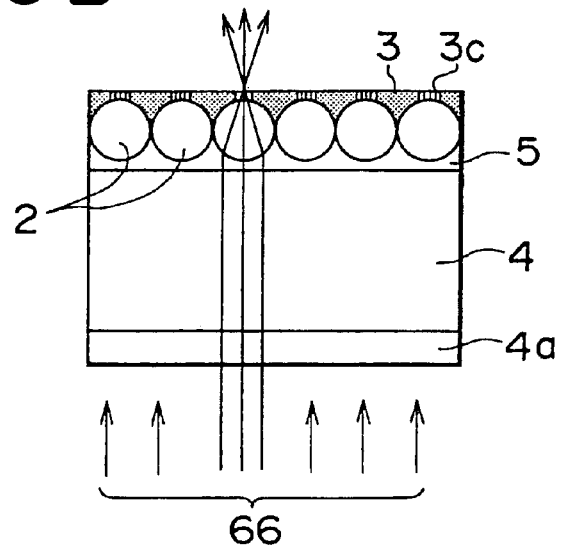
Figure 9C:
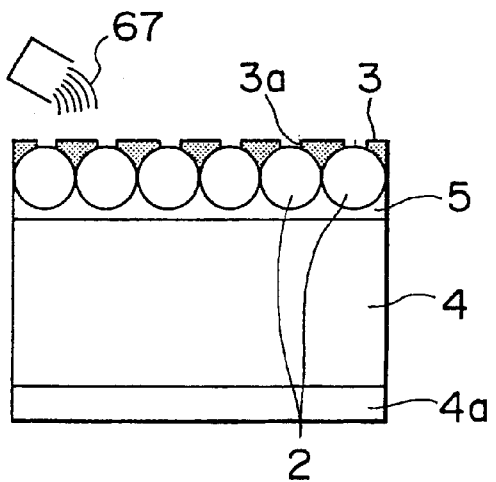

FIGS. 9A to 9C show a method of manufacturing a plano lens according to a fourth embodiment of the present invention.

In the fourth embodiment, minute transparent balls 2 are buried and fixed in a transparent adhesive layer 5 by repeating the steps from that shown in FIG. 3A to that shown in FIG. 4D in the first embodiment, and as shown in FIG. 9A, a light absorbing layer 3 made from a coloring resin composition is formed up to a thickness sufficient to substantially perfectly cover the minute transparent balls 2. The coloring resin composition is basically composed of an UV sensitive resin (photopolymer) being made soluble in a specific solvent when it is exposed to ultraviolet rays, which resin is colored by addition of carbon (carbon black). The UV sensitive resin is represented by a positive type photoresist having two components, for example, a novolac resin and o-naphtoquinonediazido sulfonate.

Then, at step shown in FIG. 9B, parallel rays 66 of ultraviolet (or rays of light equivalent thereto) are readiated from the transparent substrate 4 side, so that only a portion 3c of the light absorbing layer 3 over a light outgoing portion of each minute transparent ball 2 is exposed to the converged rays of ultraviolet through the minute transparent ball 2. In this case, a toner layer may be thinly formed in gaps between respective adjacent ones of the minute transparent balls 2 before formation of the light absorbing layer 3 for preventing portions of the light absorbing layer 3 positioned at the gaps between the minute transparent balls 2 from being irradiated with the rays of ultraviolet.

Then, as shown in FIG. 9C, a solvent 67 is brought in contact with the light absorbing layer 3, to wash away only the exposed portions 3c of the light absorbing layer 3, thereby forming openings 3a in the light absorbing layer 3.

After that, the steps shown in FIGS. 6A to 6C in the first embodiment are repeated, to manufacture a plano lens.

The method of manufacturing a plano lens in the fourth embodiment is also allowed to accurately, simply form the openings 3a of the light absorbing layer 3 only over the actual light outgoing portions of the minute transparent balls 2. The opening 3a is formed into a somewhat deep hole as shown in FIG. 9C.

FIGS. 10 to 29 show various structures of plano lenses 23 manufactured by the method of the present invention.

Figure 10:
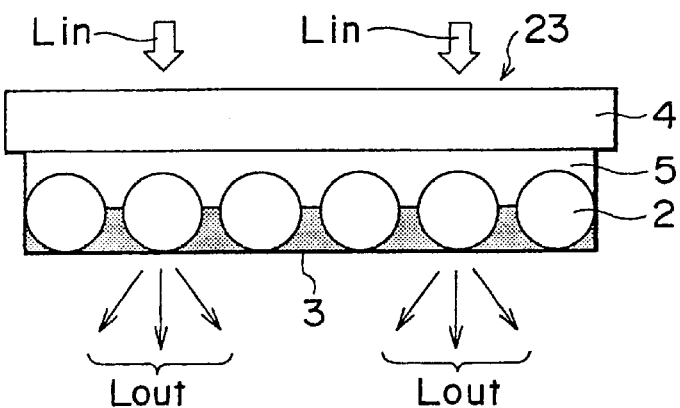
FIGS. 10 to 15 are schematic sectional views showing examples of plano lenses manufactured in accordance with the method of the present invention.

FIG. 10 shows an example of the plano lens 23 having a most basic structure composed of a transparent substrate 4 and a transparent adhesive layer 5 on the light incoming side, minute transparent balls 2, and a light absorbing layer 3. Such a plano lens 23 can be sufficiently used in the case where the minute transparent balls 2 and the light absorbing layer 3 on the light outgoing side are not particularly required to be protected.

Figure 11:
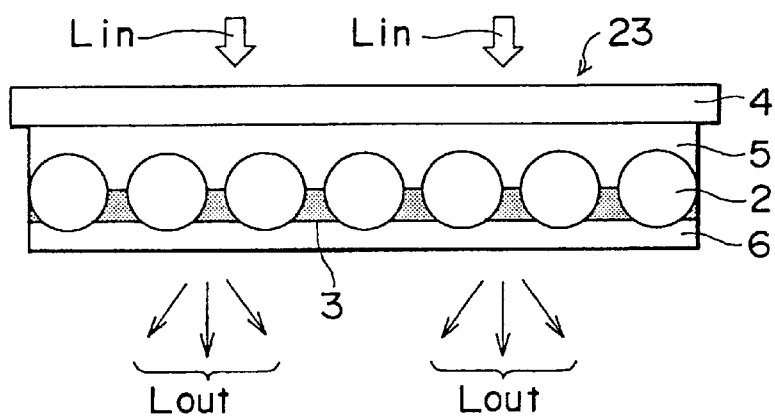

FIG. 11 shows an example modified from the most basic structure shown in FIG. 10 in that a transparent adhesive layer 6 is provided on the light outgoing side for protecting the minute transparent balls 2 and the light absorbing layer 3 on the light outgoing side.

Figure 12:
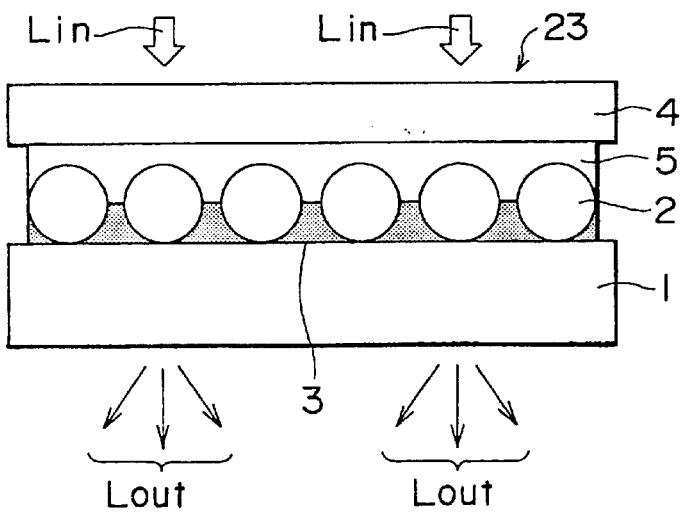

FIG. 12 shows an example modified from the most basic structure shown in FIG. 10 in that a transparent substrate 1 is provided on the light outgoing side for forcibly protecting the minute transparent balls 2 and the light absorbing layer 3 on the light outgoing side. This structure can be used in the case where the light absorbing layer 3 is made from a material having an adhesive function.

Figure 13:
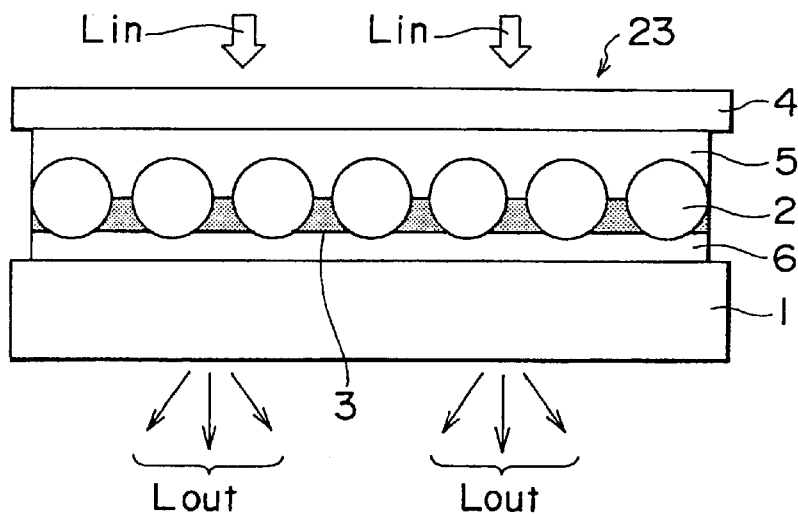

FIG. 13 shows an example modified from the most basic structure shown in FIG. 10 in that a transparent substrate 1 is provided on the light outgoing side via a transparent adhesive layer 6. This structure is manufactured by, for example, the manufacturing steps shown in FIGS. 3A to 3C, FIGS. 4A to 4D, FIGS. 5A to 5C, and FIGS. 6A to 6C.

Figure 14:
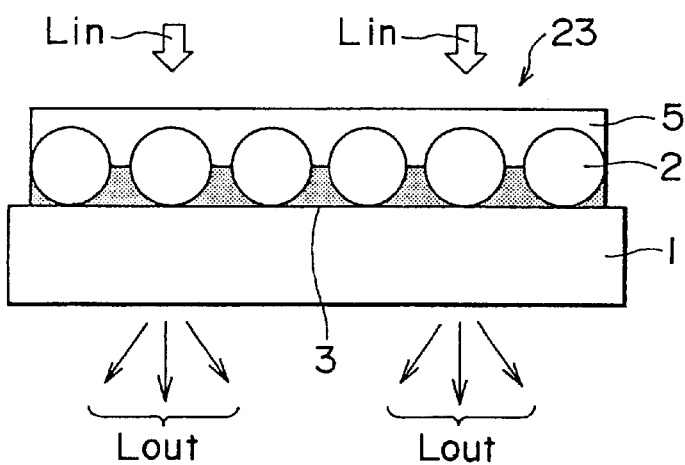

FIG. 14 shows an example modified from the structure shown in FIG. 11 in that the transparent substrate 4 on the light incoming side is omitted. This structure can be manufactured by preparing the structure shown in FIG. 11 using a peelable substrate in place of the transparent substrate 4 on the light incoming side, and peeling the peelable substrate at a suitable period.

Figure 15:
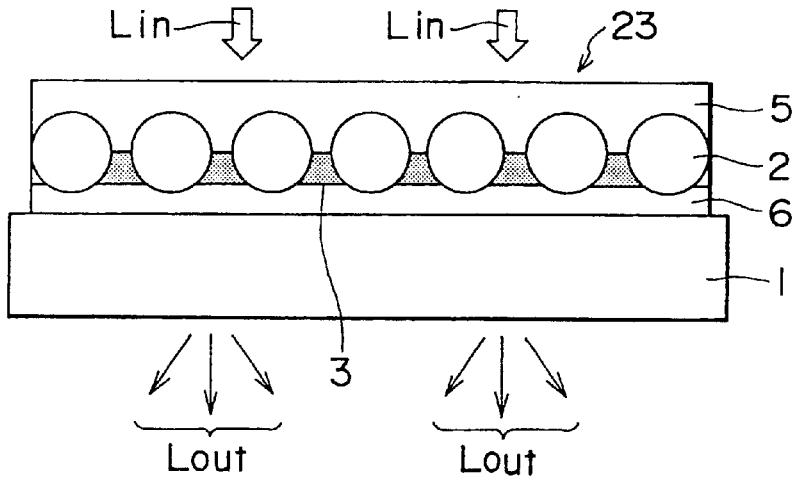

FIG. 15 shows an example modified from the structure shown in FIG. 12 in that the transparent substrate 4 on the light incoming side is omitted.

Figure 16:
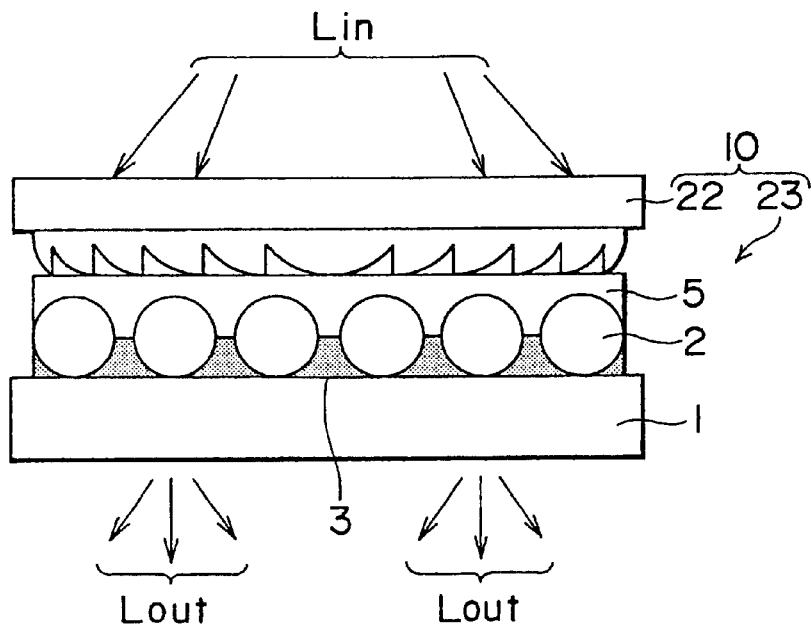
FIGS. 16 to 19 are schematic sectional views showing examples of back projection type projector screens using plano lenses manufactured in accordance with the method of the present invention.

FIG. 16 shows an example in which the structure shown in FIG. 14 is manufactured and then a Fresnel lens 22 is joined to the light incoming side of the plano lens 23, to obtain an integral type transmission screen 10.

Figure 17:
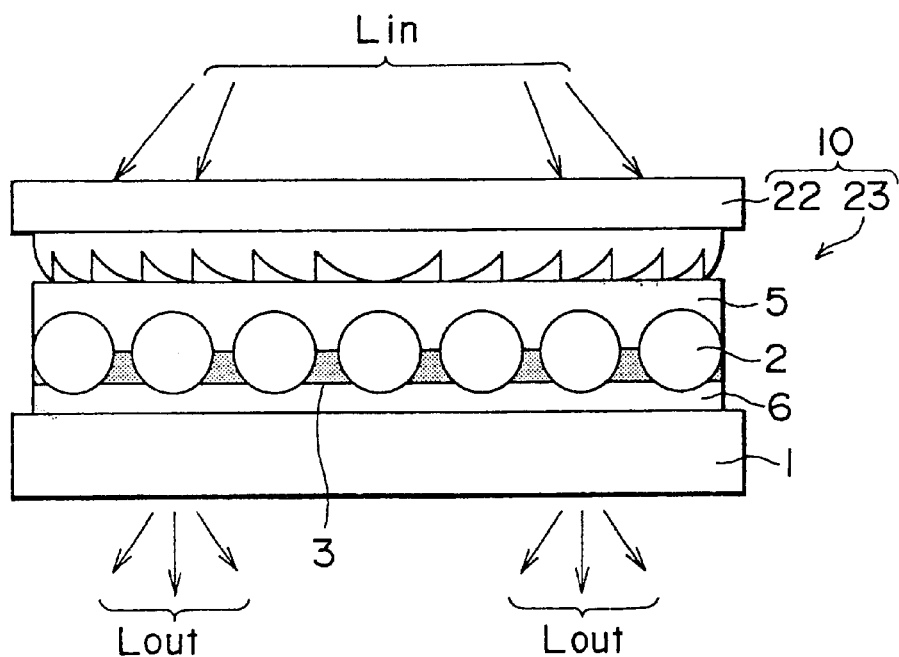

FIG. 17 shows an example in which the structure shown in FIG. 15 is manufactured and then a Fresnel lens 22 is joined to the light incoming side of the plano lens 23, to obtain an integral type transmission screen 10.

Figure 18:
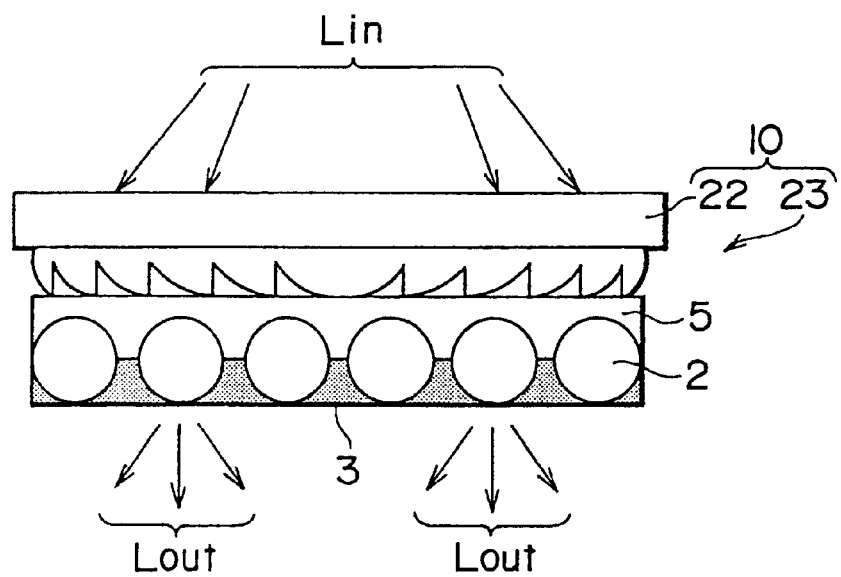

FIG. 18 shows an example in which the structure shown in FIG. 10 is manufactured using a peelable substrate in place of the transparent substrate 4 to obtain a plano lens 23, the peelable substrate is peeled, and then a Fresnel lens 22 is joined to the light incoming side of the plano lens 23, to obtain an integral type transmission screen 10. In this way, the shape stability of the plano lens 23 can be ensured without provision of any substrate thereto, by joining the Fresnel lens 22 to the plano lens 23.

Figure 19:
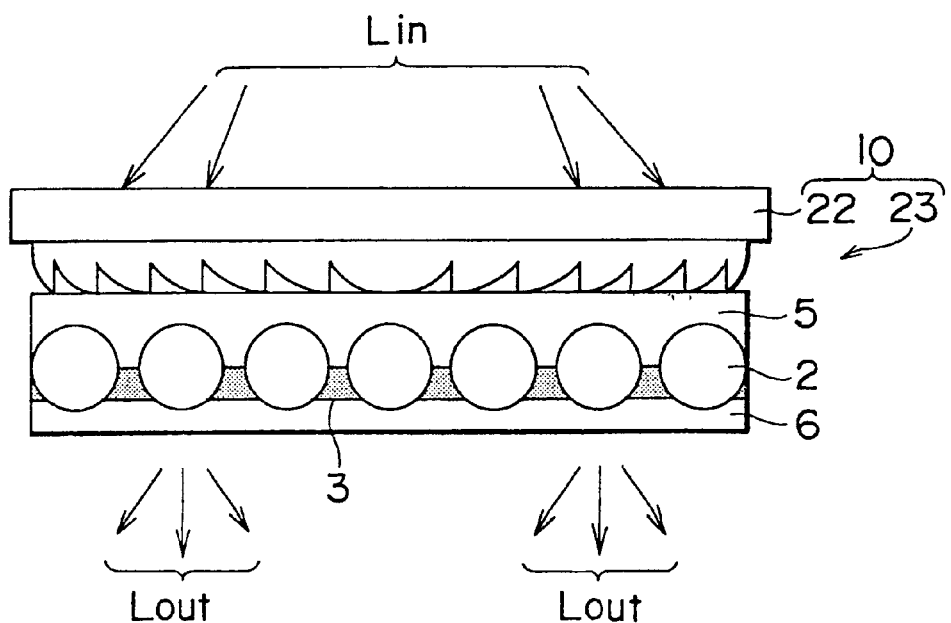

FIG. 19 shows an example in which the structure shown in FIG. 11 is manufactured using a peelable substrate in place of the transparent substrate 4 to obtain a plano lens 23, the peelable substrate is peeled, and then a Fresnel lens 22 is joined to the light incoming side of the plano lens 23, to obtain an integral type transmission screen 10.

Figure 20:
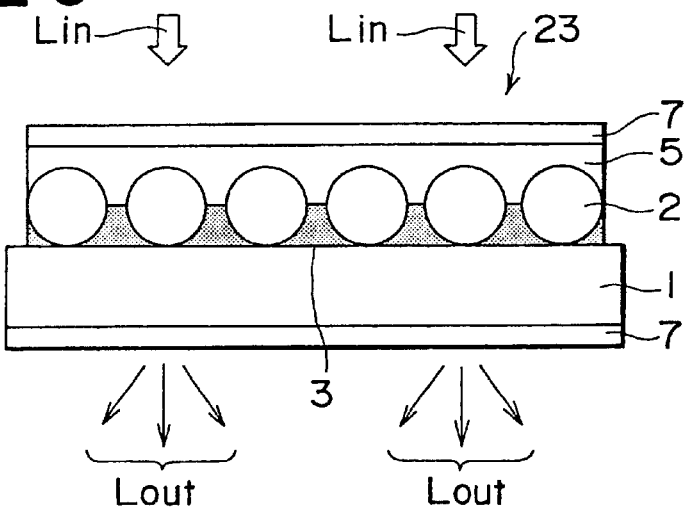
FIGS. 20 to 25 are schematic sectional views showing examples of plano lenses manufactured in accordance with the method of the present invention.

FIG. 20 shows an example modified from the structure shown in FIG. 14 in that a reflection preventive film 7 made from silicon oxide ($SiO_2$) or the like is provided on each of the light incoming side and the light outgoing side of the plano lens 23.

Figure 21:
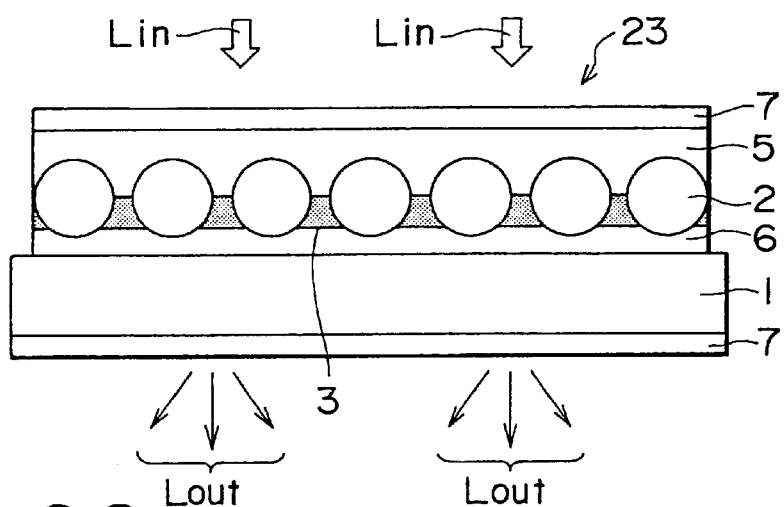

FIG. 21 shows an example modified from the structure shown in FIG. 15 in that a reflection preventive film 7 is provided on each of the light incoming side and the light outgoing side of the plano lens 23.

Figure 22:
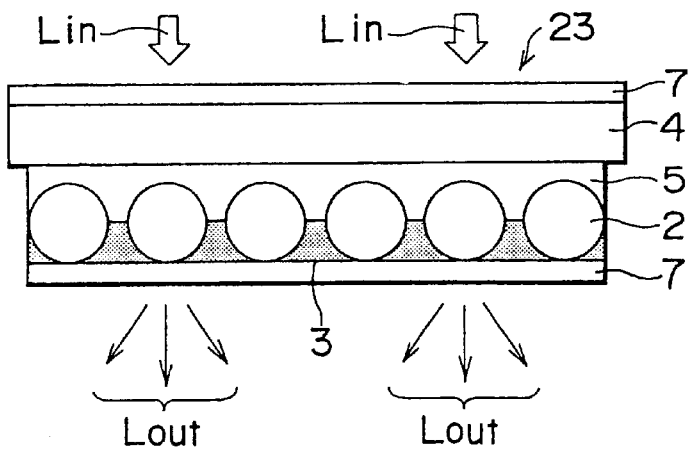

FIG. 22 shows an example modified from the structure shown in FIG. 10 in that a reflection preventive film 7 is provided on each of the light incoming side and the light outgoing side of the plano lens 23.

Figure 23:
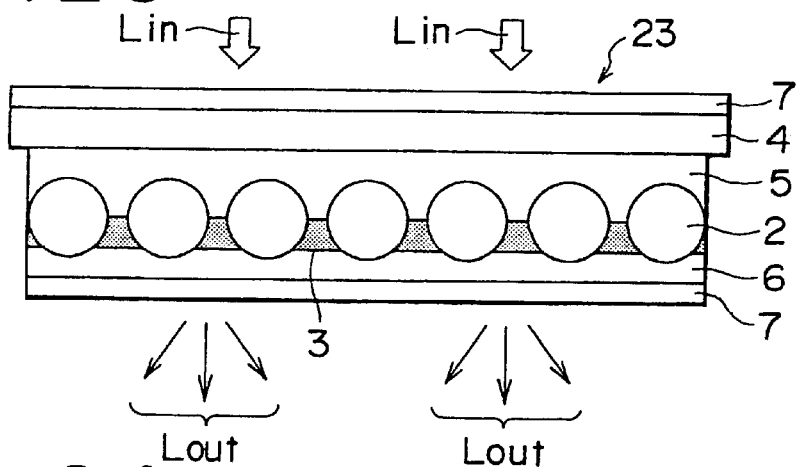

FIG. 23 shows an example modified from the structure shown in FIG. 11 in that a reflection preventive film 7 is provided on each of the light incoming side and the light outgoing side of the plano lens 23.

Figure 24:
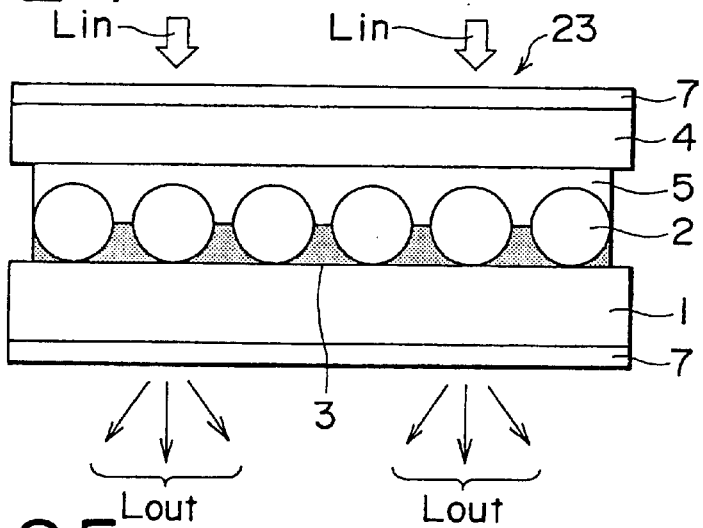

FIG. 24 shows an example modified from the structure shown in FIG. 12 in that a reflection preventive film 7 is provided on each of the light incoming side and the light outgoing side of the plano lens 23.

Figure 25:
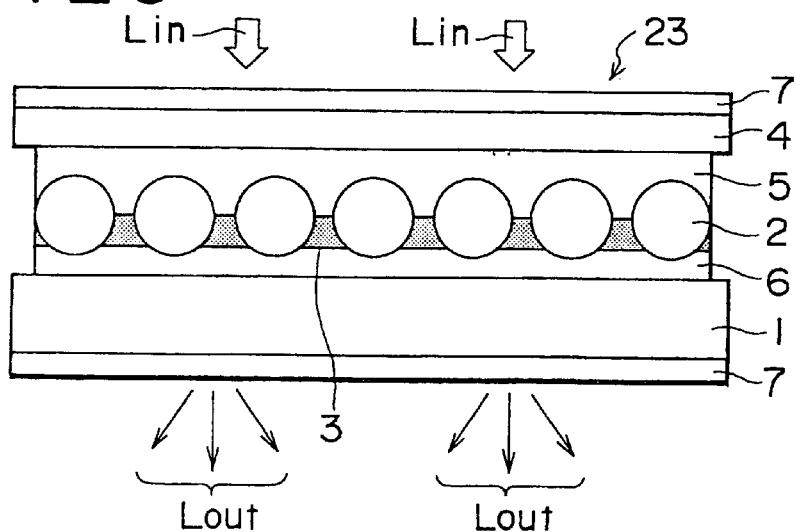

FIG. 25 shows an example modified from the structure shown in FIG. 13 in that a reflection preventive film 7 is provided on each of the light incoming side and the light outgoing side of the plano lens 23.

Figure 26:
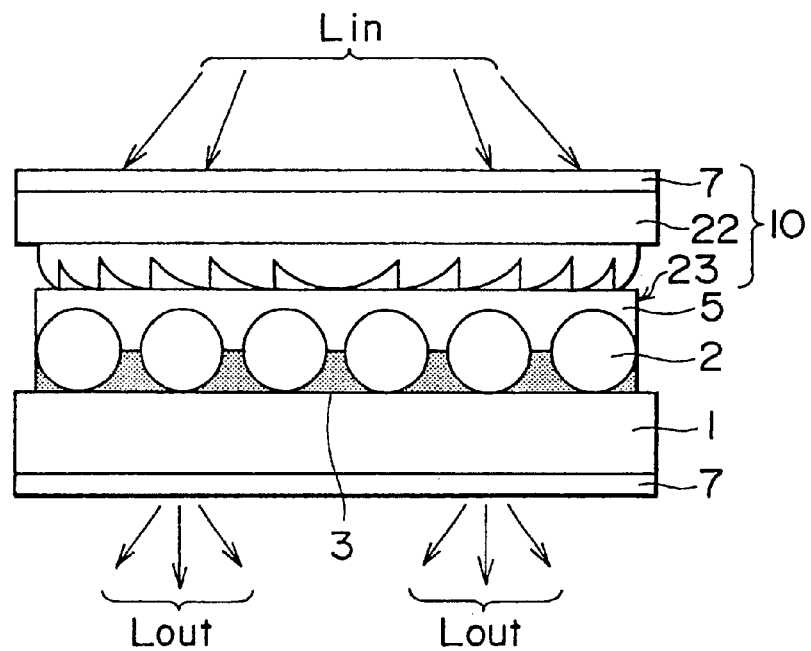
FIGS. 26 to 29 are schematic sectional views showing examples of back projection type projector screens using plano lenses manufactured in accordance with the method of the present invention.

FIG. 26 shows an example modified from the structure shown in FIG. 16 in that a reflection preventive film 7 is provided on each of the light incoming side of the Fresnel lens 22 and the light outgoing side of the plano lens 23.

Figure 27:
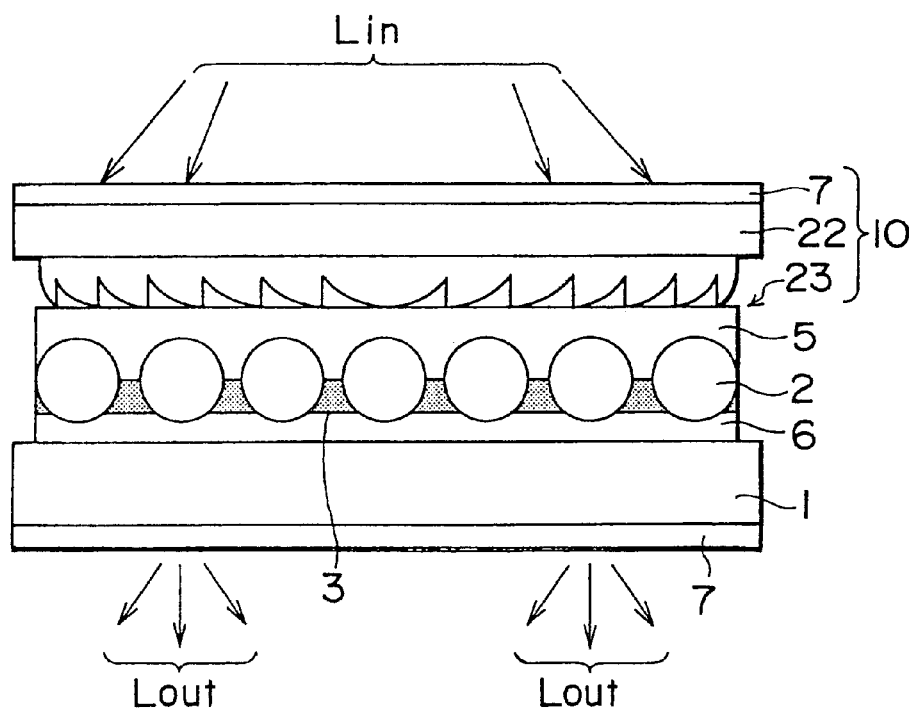

FIG. 27 shows an example modified from the structure shown in FIG. 17 in that a reflection preventive film 7 is provided on each of the light incoming side of the Fresnel lens 22 and the light outgoing side of the plano lens 23.

Figure 28:
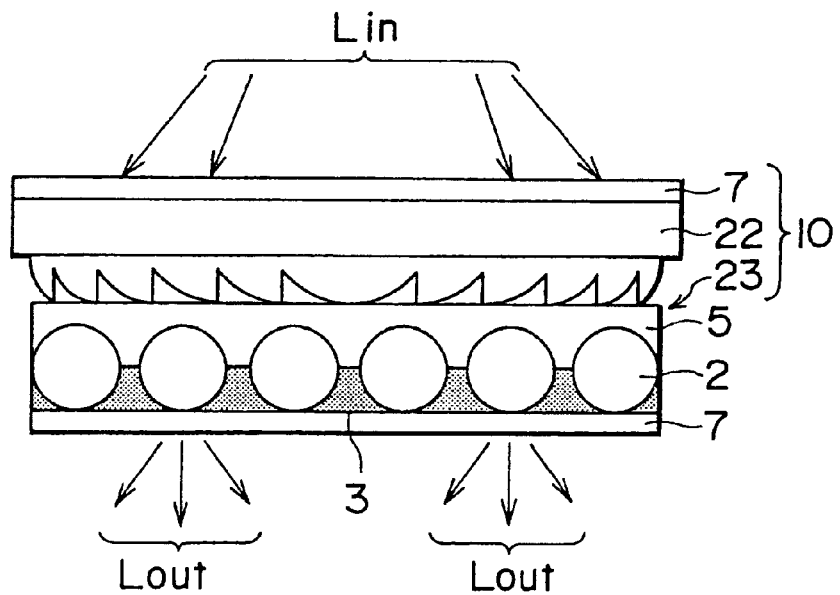

FIG. 28 shows an example modified from the structure shown in FIG. 18 in that a reflection preventive film 7 is provided on each of the light incoming side of the Fresnel lens 22 and the light outgoing side of the plano lens 23.

Figure 29:
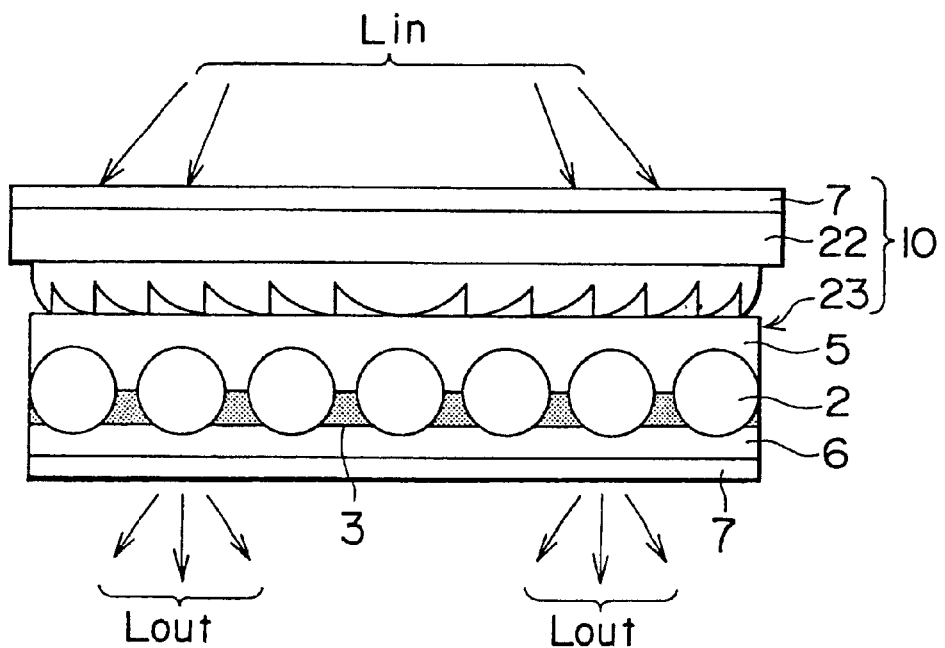
Figure 30:
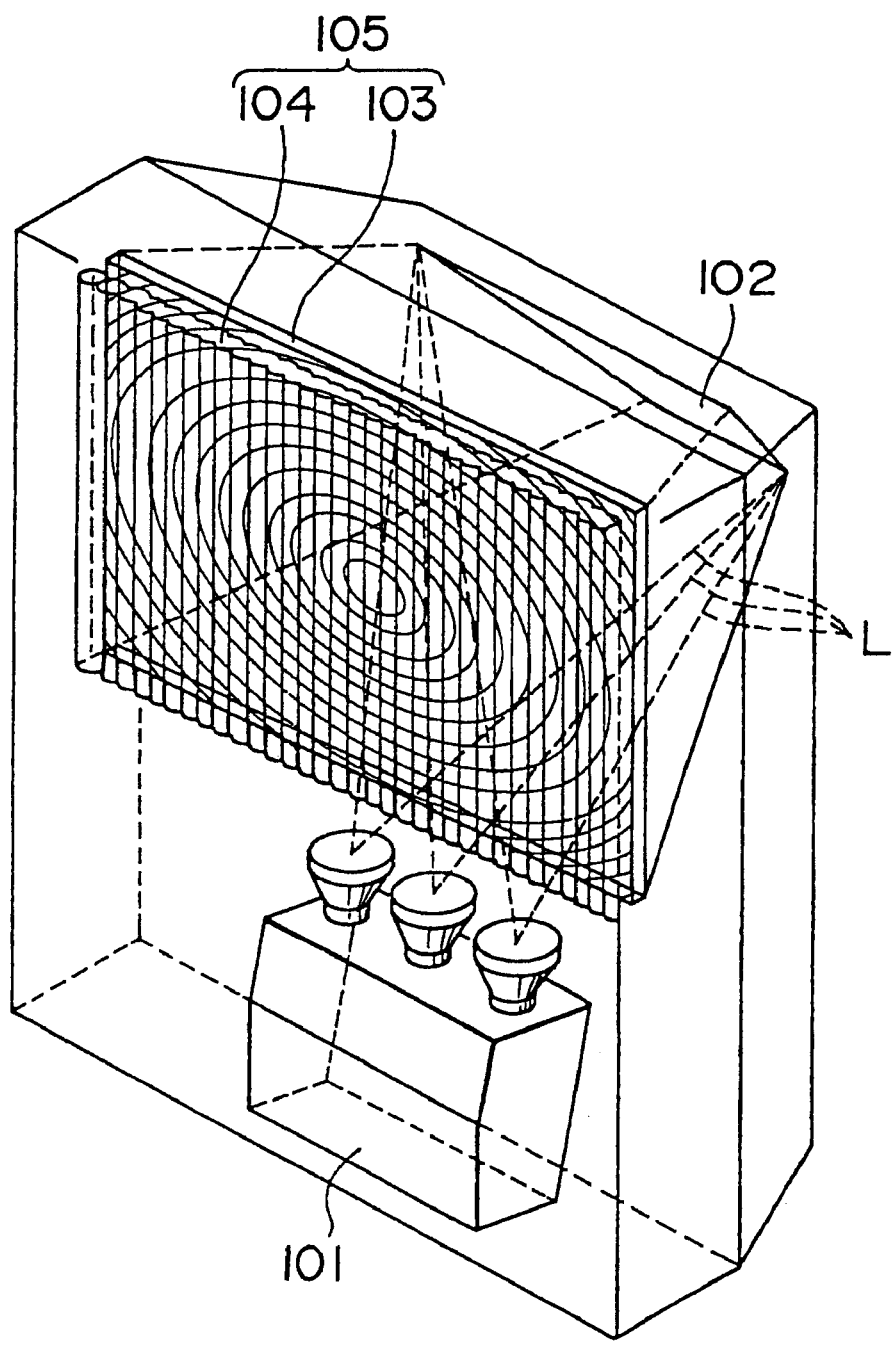
FIG. 30 is a schematic view showing a related art back projection type projector.
Figure 31A:
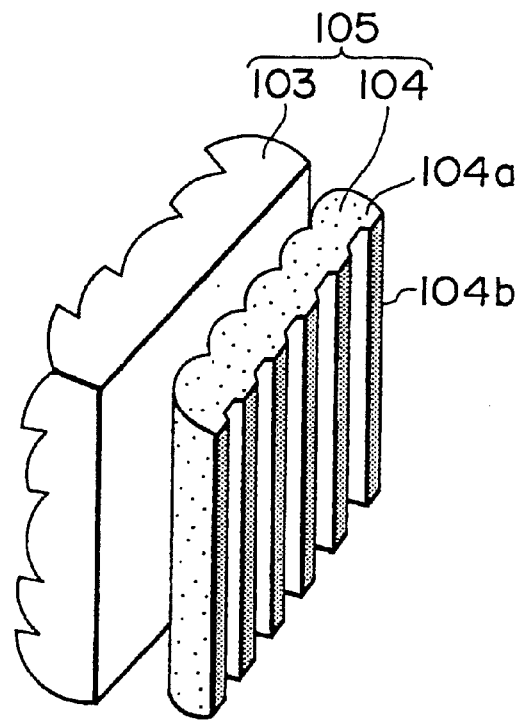
FIGS. 31A and 31B are a schematic view and a sectional view showing a configuration of a lenticular lens for a related art back projection type projector, respectively.
Figure 31B:
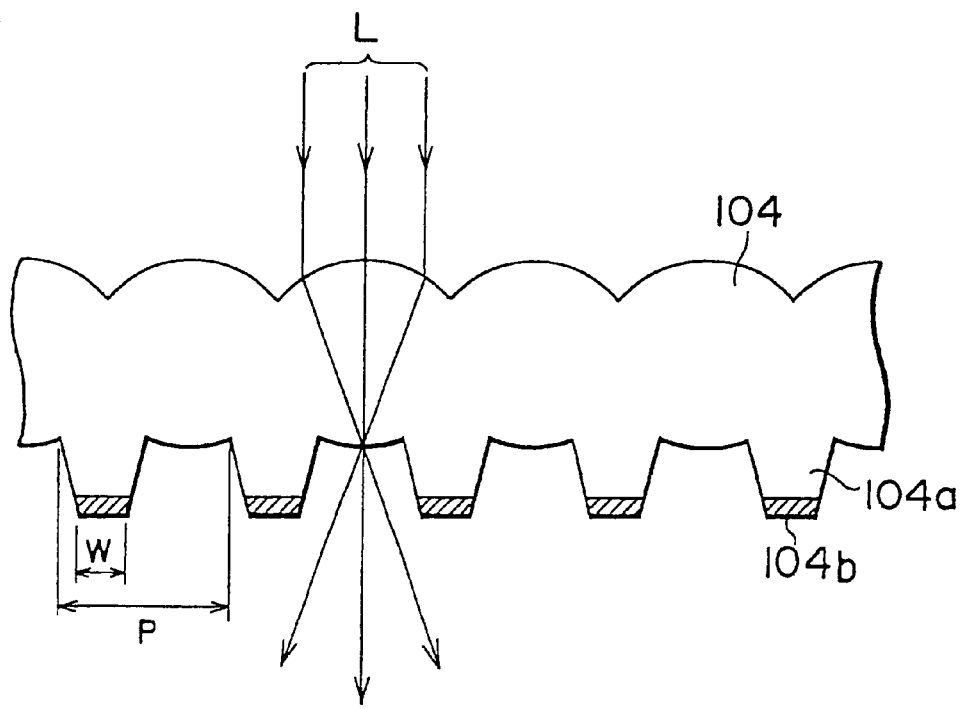

FIG. 29 shows an example modified from the structure shown in FIG. 19 in that a reflection preventive film 7 is provided on each of the light incoming side of the Fresnel lens 22 and the light outgoing side of the plano lens 23.

Each of the plano lenses 23 described above is particularly suitable for use in the transmission screen 10 for a back projection type projector shown in FIG. 32 or 33.

In the above-described embodiments, the minute transparent balls 2 are arranged on a plane surface; however, they may be arranged on a curved surface along a slightly curved transparent substrate.

While the preferred embodiments of the present invention have been described using specific terms, such description is for illustrative purposes only, and it is to be understood that changes and variations may be made without departing from the spirit or scope of the following claims.

What is claimed is:

1. A method of manufacturing a plano lens, comprising the steps of:

forming a first transparent adhesive layer on a transparent substrate;

supplying a plurality of minute transparent balls on said first transparent adhesive layer and burying said minute transparent balls in said first transparent adhesive layer up to a specific depth;

forming a second transparent adhesive layer, which loses its adhesiveness when exposed to light, up to a thickness sufficient to fill gaps between respective adjacent ones of portions, exposed from said first transparent adhesive layer, of said plurality of minute transparent balls and further to cover said plurality of minute transparent balls;

radiating parallel rays of light from said transparent substrate side, to expose a portion of said second transparent adhesive layer positioned over a light outgoing portion of each of said minute transparent balls to said rays of light converged through said minute transparent ball; and forming a light absorbing layer on non-exposed portions of said second transparent adhesive layer.

2. A method of manufacturing a plano lens according to claim 1, wherein ultraviolet rays are used as said rays of light to which a portion of said second transparent adhesive layer is exposed.

3. A method of manufacturing a plano lens according to claim 1, further comprising the step of:

stacking, after said step of forming said light absorbing layer, a second transparent substrate on said light absorbing layer via a third transparent adhesive layer.

* * * * *